United States Patent [19]
Kano et al.

[11] Patent Number: 4,839,525
[45] Date of Patent: Jun. 13, 1989

[54] METHOD OF AND APPARATUS FOR MEASURING COORDINATES OF EDGES OF TAPE

[75] Inventors: Yukio Kano; Kuniyuki Yoshikawa; Hideaki Kishida; Hiroshi Ito; Mitsutoshi Maeda, all of Aichi, Japan

[73] Assignees: Kabushiki Kaisha Tokai Rika Denki Seisakusho; Kabushiki Kaisha Toyota Chuo Kenkyusho, both of Aichi, Japan

[21] Appl. No.: 94,751

[22] Filed: Sep. 9, 1987

[30] Foreign Application Priority Data

Sep. 10, 1986 [JP] Japan .................... 61-213429

[51] Int. Cl.$^4$ ............................. G01N 21/86
[52] U.S. Cl. ............................. 250/560; 356/4
[58] Field of Search ............ 250/560, 561; 356/1, 356/4, 141, 152

[56] References Cited
U.S. PATENT DOCUMENTS 4,136,949 1/1979 Hayamizu et al. .................. 356/4
4,212,534 7/1980 Bodlaj .................................. 356/1
4,425,043 1/1984 van Rosmalen ................. 250/561
4,732,472 3/1988 König et al. ....................... 356/4

Primary Examiner—David C. Nelms
Assistant Examiner—Stephone B. Allen
Attorney, Agent, or Firm—Robbins & Laramie

[57] ABSTRACT

A method of and an apparatus for measuring the coordinates of each edge of a tape is disclosed. The method comprises the steps of attaching a tape to a surface of an object, such as a three-dimensional subject, to be measured in such a manner that at least one edge of the tape is placed along a measurement line, such as an edge, on the surface, the tape and the surface differing from each other in reflectance; projecting a deflected spot beam onto the area of the surface of the object including the edges of the tape; and detecting the portion of the area the reflectance of which sharply varies, thereby calculating the two-dimensional coordinates of the thus-detected values. Accordingly, it is possible to accurately measure the three-dimensional configuration along the measurement line.

7 Claims, 18 Drawing Sheets

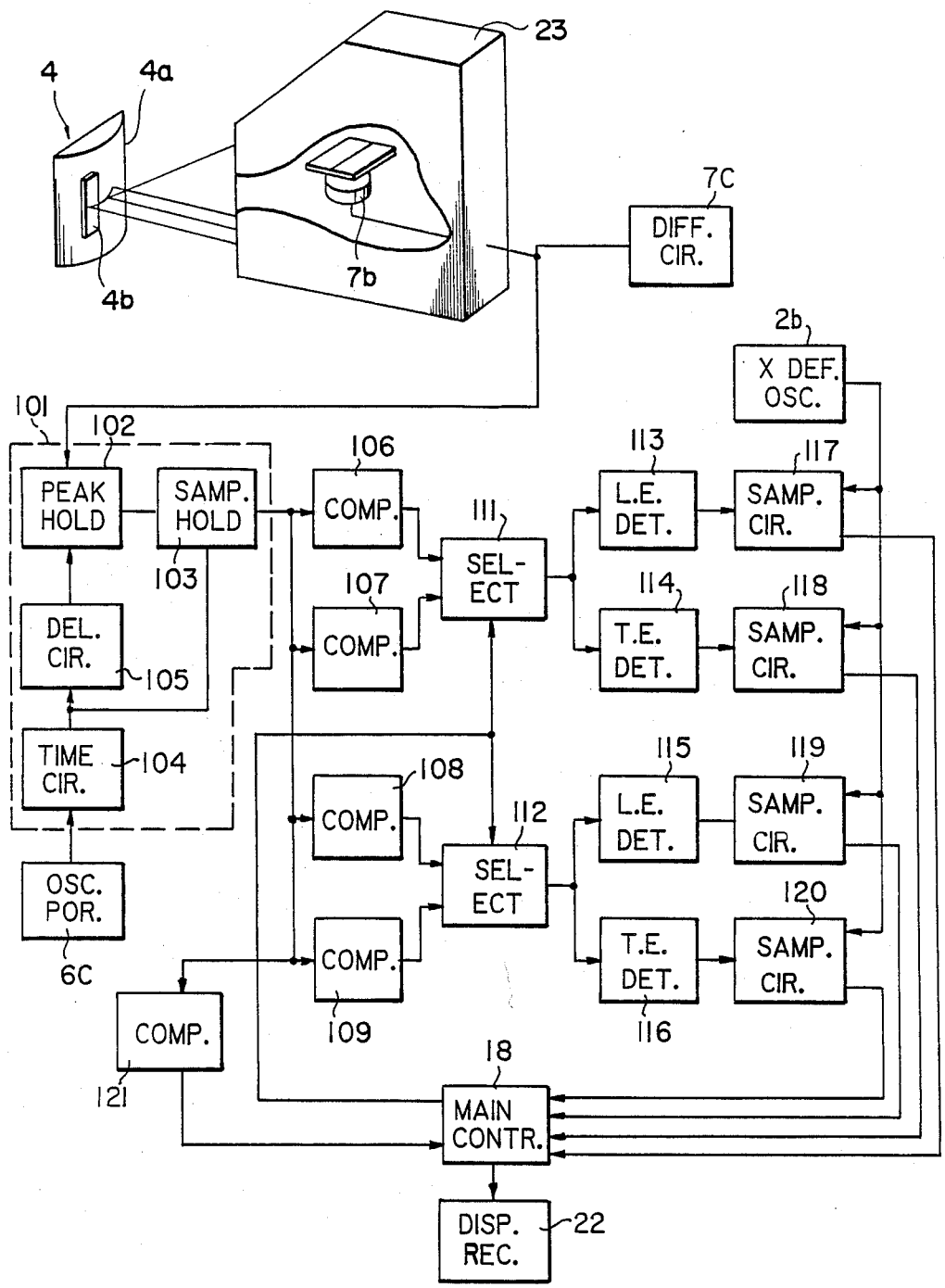

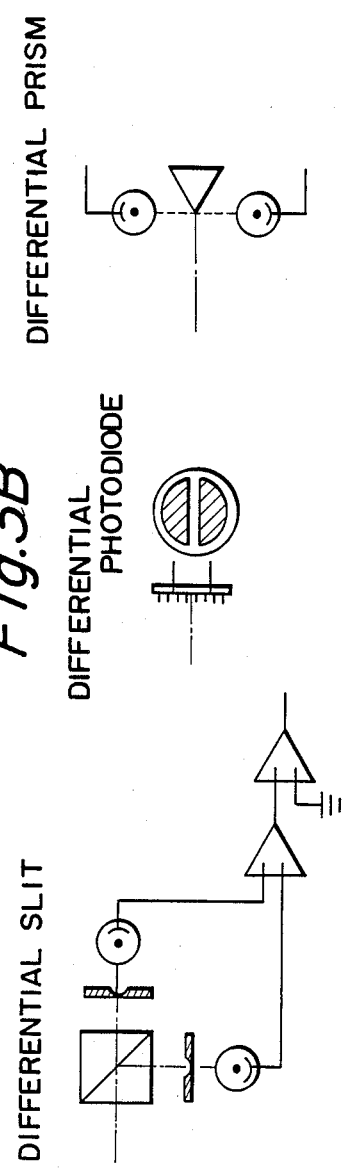
Fig.3A DIFFERENTIAL SLIT
Fig.3B DIFFERENTIAL PHOTODIODE
Fig.3C DIFFERENTIAL PRISM
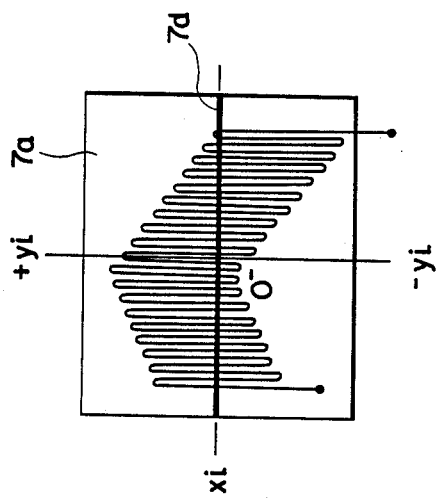
Fig.5

DEFLECTION ANGLE OF X-AXIS BEAM DEFLECTOR 2

OUTPUT FROM X-AXIS SAMPLING CIRCUIT 8

OUTPUT FROM Y-AXIS SAMPLING CIRCUIT 9

$do < di < dt$

METHOD OF AND APPARATUS FOR MEASURING COORDINATES OF EDGES OF TAPE

BACKGROUND OF THE INVENTION

1. Field of the Invention

The present invention relates to a method of and an apparatus for measuring the coordinates of the edges of a tape. More specifically, the invention pertains to a method of measuring the coordinates of the tape edges and an apparatus for carrying out the method, the method comprising the steps of attaching a tape to a three-dimensional subject by adhesion or the like such that one edge of the tape is positioned along one edge of the subject, the tape having a reflectance different from that of the subject, automatically detecting the edge of the tape in a non-contact manner; and tracking the thus-detected edge, thereby measuring the coordinates of the edge of the tape in a non-contact manner.

2. Description of the Prior Art

During production of certain kinds of structure, machine part, die (press die, forecasting die) or model, it is well known that the three-dimensional coordinates of an edge of such a subject where surfaces thereof meet are employed in the form of data representative of the configuration of the subject as an inspection or production reference. For example, in a case where a model of a vehicle body or a die thereof is produced, the configuration of its surface is generally a freely curved surface. Therefore, it is common practice to employ the three-dimensional coordinates of an edge as a production reference or an inspection reference for the surface. In particular, in the case of a model or a die of the external appearance of the vehicle body, the configurations of each edge, after production, serves as a characteristic curve which greatly influences the external appearance of the vehicle body. Accordingly, the coordinates of the edges are measured as particularly important data, and thus various inspections need to be performed based on the data.

The general surfaces and freely curved surfaces of the three-dimensional subject are automatically measured by means of a three-dimensional-coordinate measurement machine. However, the coordinates of edges are conventionally measured in a contact manner by adjusting a measurement probe to the apex of each of the edges with the eye. In a process in which the surface is automatically worked and measured, a large number of steps are required to measure the edges. In addition, since this measurement is manually performed, the accuracy of measurement varies due to large errors involved in the measurement. Moreover, it is likely that a scratch may be formed on a surface to be measured.

In another known method, the position or configuration of a three-dimensional subject is measured in a non-contact manner. In this method, a beam of light is projected onto a surface of the subject, and the locus of the beam which is bent at the edge is observed through a TV camera (an integration type image-pickup tube) at a certain angle to perform triangulation, thereby obtaining data representing the edge.

In this known method, however, it becomes necessary to prevent the image from being dimmed due to variations in the distance from the subject. More specifically, in a case where a dim image is projected onto several pixels of the TV camera, several kinds of image processing such as thinning are needed in order to accurately obtain the position of the image. This may lead to the problem that the speed of processing is reduced due to the time spent for such image processing. Also, where surfaces other than completely diffusing surfaces are measured, it is impossible to obtain an accurately measured value due to various influences such as mirror reflection.

SUMMARY OF THE INVENTION

It is therefore an object of the present invention to provide a method of measuring the coordinates of an edge of a tape and an apparatus for carrying out the same, in both of which the above-described problems involved in the prior art can be solved.

It is another object of the present invention to provide a method of and an apparatus for measuring the lines of a three-dimensional subject having a complicated and irregular form to obtain the three-dimensional coordinates of the measured lines.

It is the other object of the present invention to provide a method of and an apparatus for measuring the edges of a three-dimensional subject to obtain the three-dimensional coordinates of the measured edges.

To these ends, in accordance with one aspect of the present invention, there is provided a method of measuring the coordinates of each edge of a tape comprising the steps of: (a) attaching the tape to a surface of an object to be measured such that at least one edge of the tape is placed along a measurement line on the surface to be measured, the tape and the surface differing from each other in reflectance; (b) projecting a spot beam in a scanning manner onto the area of the surface of the object including the edges of the tape so as to reflect the spot beam thereon while deflecting the spot beam within a predetermined width which allows the spot beam to traverse the edges; and (c) detecting the portion of the area the reflectance of which sharply varies with respect to the projection of the spot beam, thereby performing calculations on the two-dimensional coordinates of the edges of the tape.

In accordance with another aspect of the present invention, there is provided an apparatus for measuring the coordinates of each edge of a tape comprising: (a) a detecting optical head including projecting means for projecting a deflected spot beam in a scanning manner onto a measurement area of a surface of an object to be measured, the measurement area having the tape attached thereto such that at least one edge of the tape is placed along a measurement line on the surface to be measured, the tape and the surface differing from each other in reflectance; light receiving means for converging light reflected from the object in a direction perpendicular to the direction of deflected scan of the spot beam and at a predetermined angle with respect to the direction of projection of the spot beam to thereby focus an image on a predetermined position; focus position oscillating means for oscillating the image focused by the light receiving means in a direction perpendicular to the direction of deflection of the spot beam; and a detecting optical head having beam-spot detecting means for detecting the presence of the spot beam focused by the light receiving means within an area having a predetermined length in the direction of deflection of the spot beam and an extremely small width in a direction perpendicular to the direction of deflection of the spot beam; (b) measuring means for measuring the cross-sectional configuration of the tape by obtaining the two-dimensional coordinates of a cross-sectional configuration of the object including the tape of the basis of a deflection signal from the projecting means for projecting the deflected spot beam and an oscillation signal from the focus position oscillating means while employing a detection signal from the beam-spot detecting means as a synchronizing signal; and (c) calculating means for calculating the coordinates of the edge of the tape from the two-dimensional coordinates obtained by the means for measuring the cross-sectional configuration of the tape.

In these method and apparatus, a tape is attached to a surface of an object to be measured such that one edge of the tape corresponds to a line on the surface to be measured, and the tape and the surface differ from each other in reflectance. It is therefore possible to measure the coordinates of each of the tape in a non-contact manner by attaching the tape to an edge of a three-dimensional subject. Accordingly, the coordinates of the tape edge are measured by deflecting a beam of light within a predetermined width, projecting a spot of the thus-deflected beam onto the surface area of the object that includes the edge of the tape, sequentially detecting, on the basis of the reflected light, the portions of the object the reflectance of which sharply varies, that is, the edge of the tape, and performing calculations on the corresponding two-dimensional coordinates to obtain the coordinates of the tape edge. Moreover, since the tape edge is automatically discriminated, it is possible to measure the coordinates in a short time. In addition, if a white tape having a high reflectance and a black tape having a low reflectance are selectively employed, it is possible to easily measure the coordinates of tape edges attached to any kind of surface other than a glossy surface such as a mirror.

Further objects, features and advantages of the present invention will become apparent from the following description of preferred embodiments of the present invention with reference to the accompanying drawings.

BRIEF DESCRIPTION OF THE DRAWINGS

FIG. 2 is a diagrammatic view of the first embodiment which is used for explaining another function thereof;

FIG. 3A is a schematic view of one example of a beam-spot detector applicable to the present invention and illustrates a differential-slit arrangement;

FIG. 3B is a schematic view of another example of the beam-spot detector applicable to the present invention and illustrates a differential photodiode;

FIG. 3C is a schematic view of still another example of the beam-spot detector applicable to the present invention and illustrates a differential prism;

FIG. 5 is a view of the locus of the beam spot which is focused to the optical slit;

Figure 1:
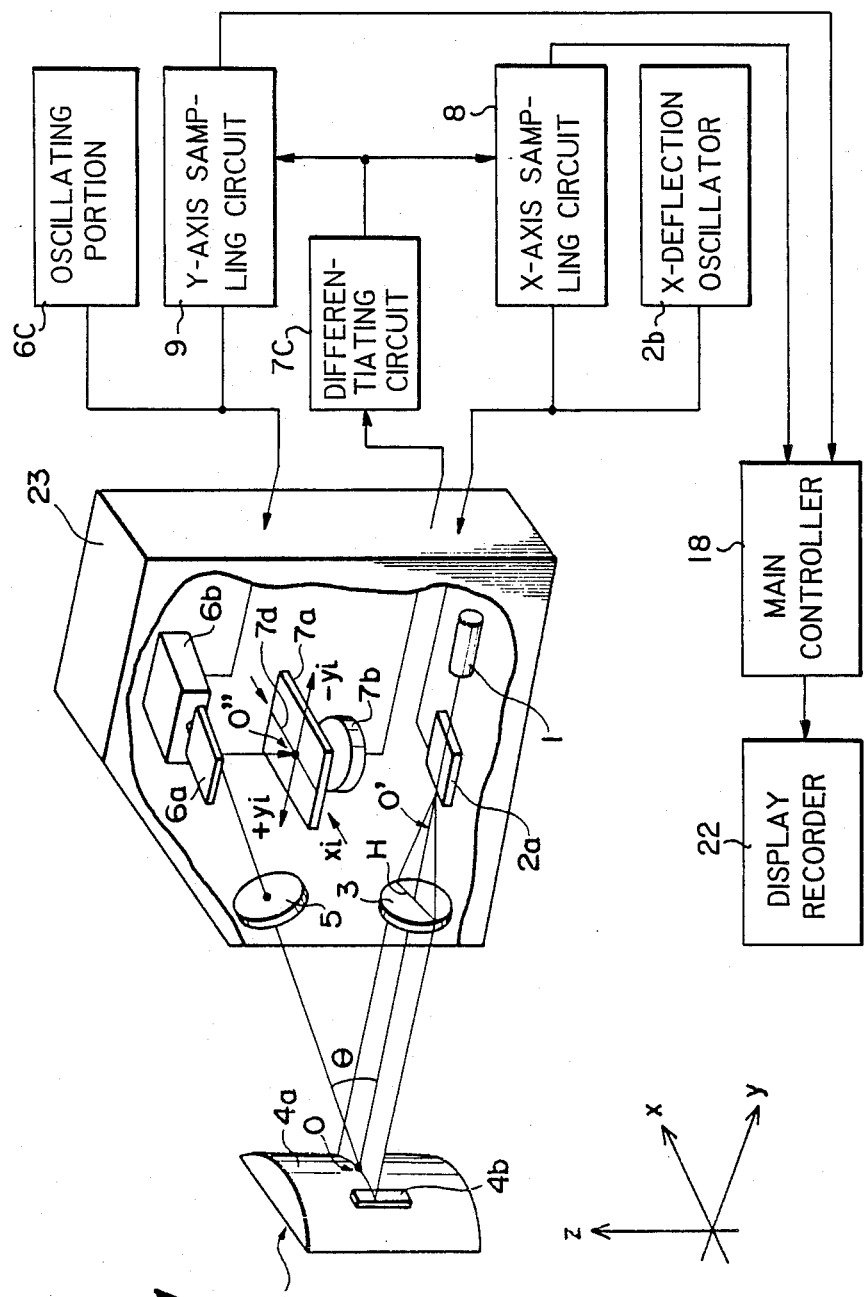
FIG. 1 is a diagrammatic view of a first preferred embodiment of the present invention and is used for explaining one function thereof.
Figure 9:
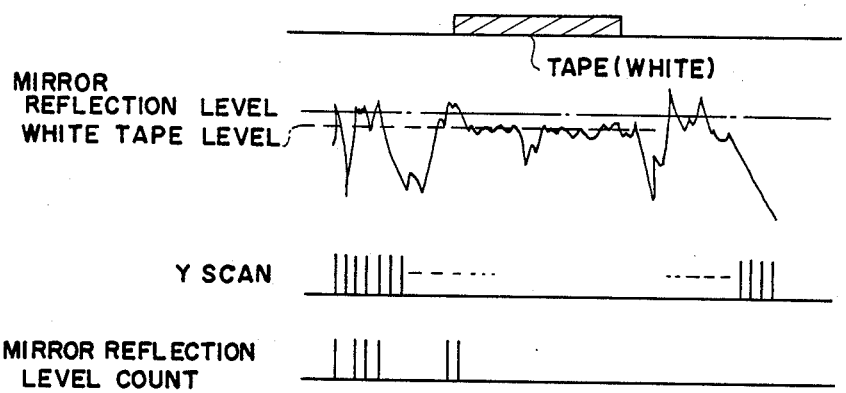
Figure 10:
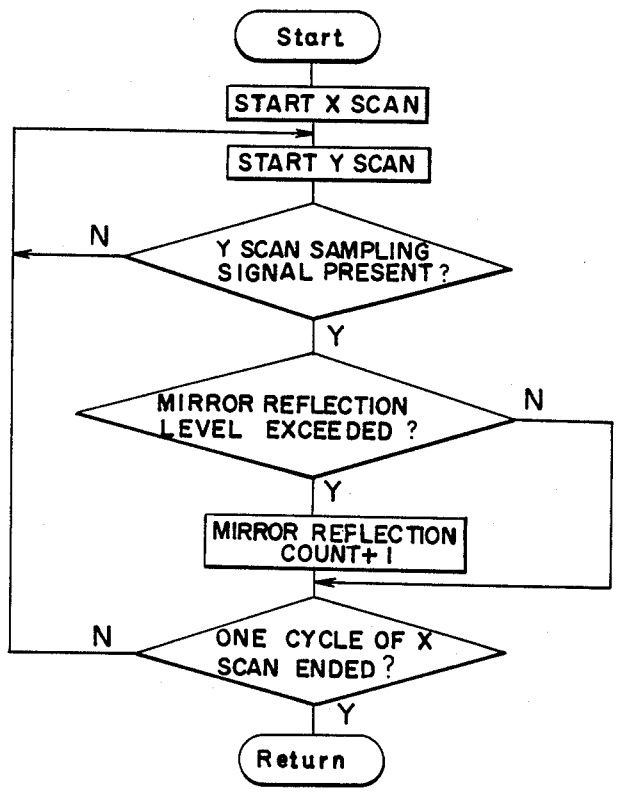
Figure 11:
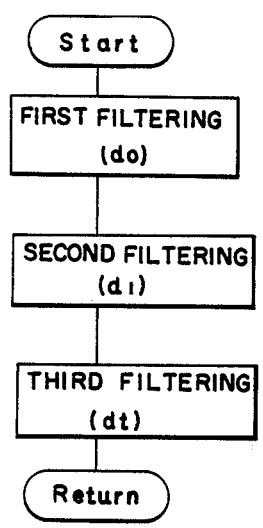
Figure 12:
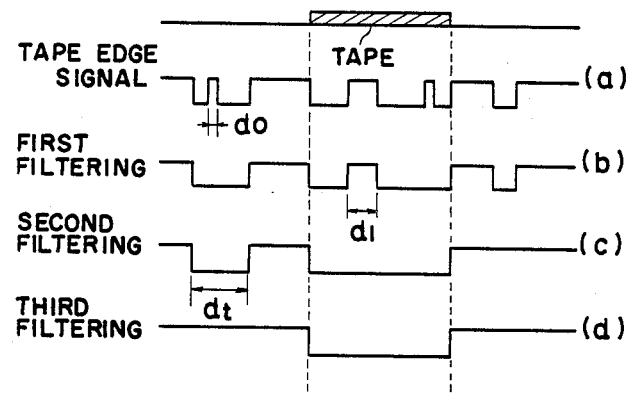
Figure 14:
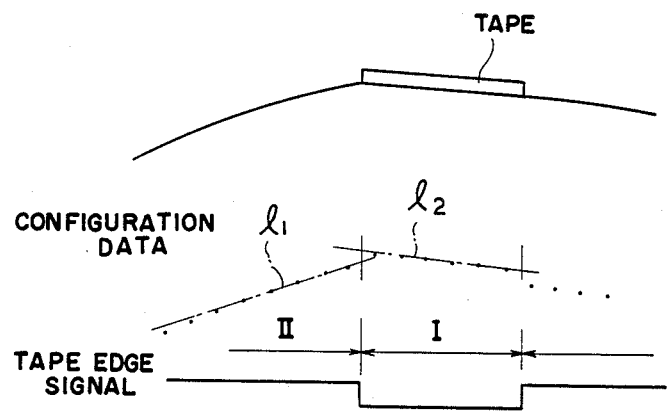
Figure 13:
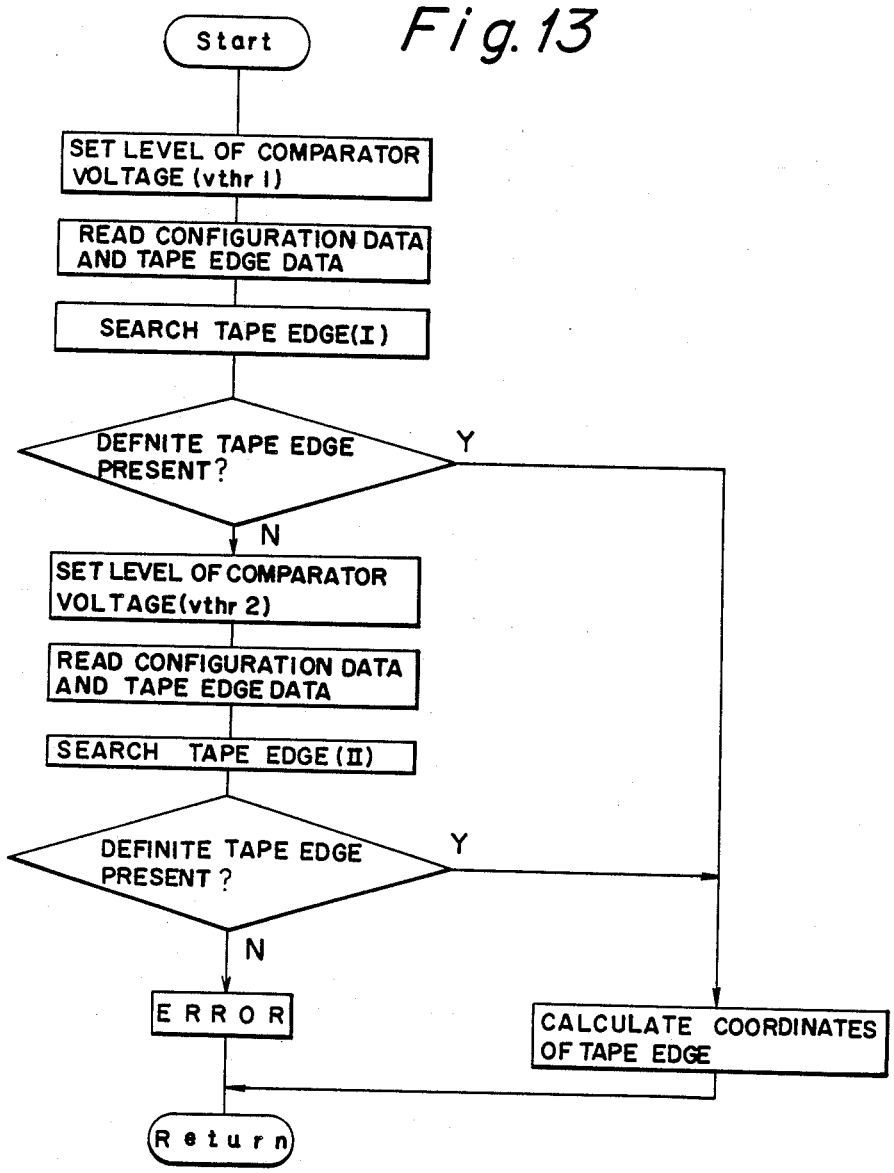
Figure 15:
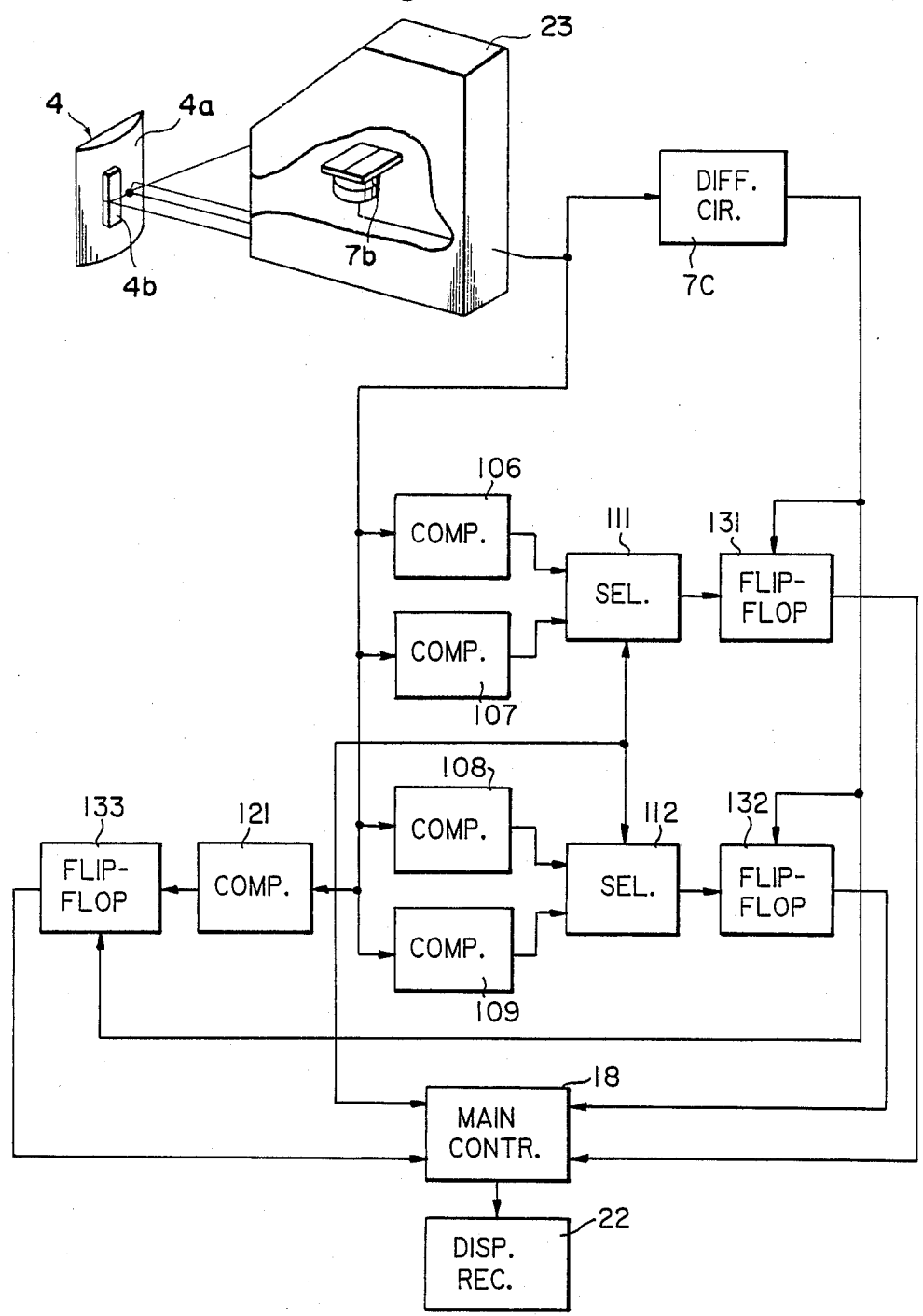
Figure 16:
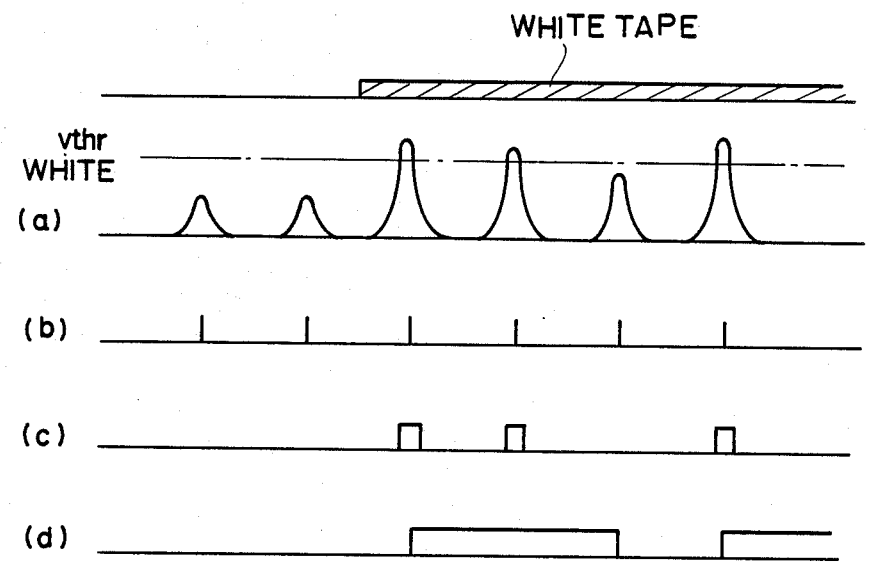
Figure 17:
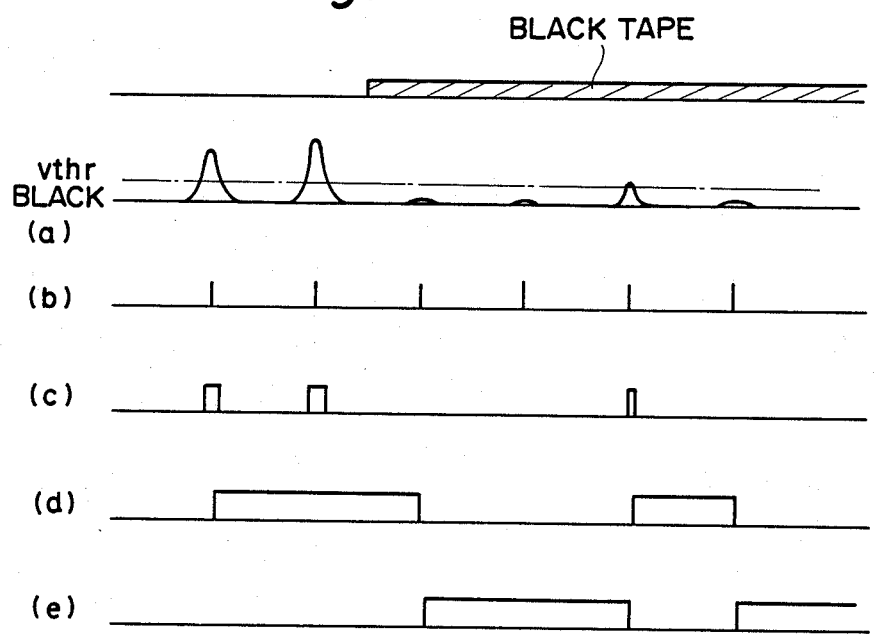
Figure 18:
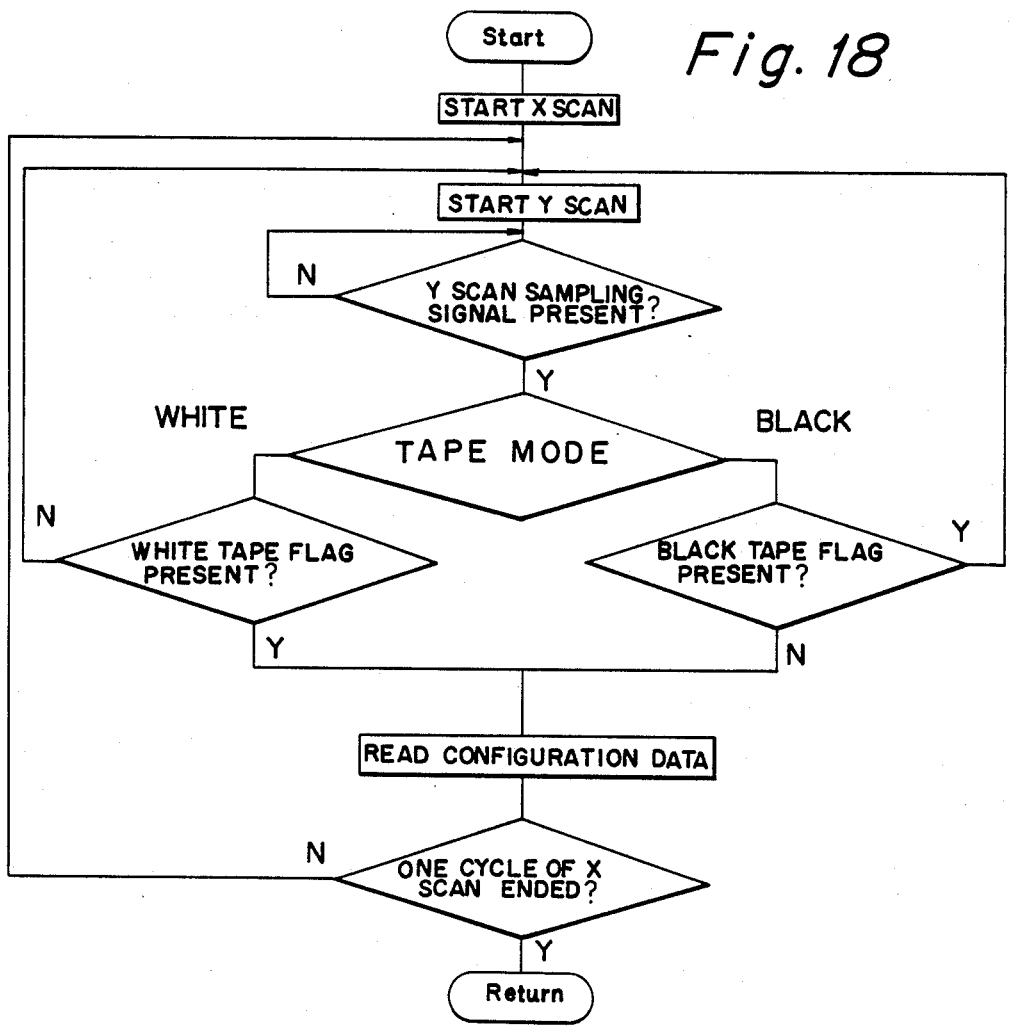
Figure 19:
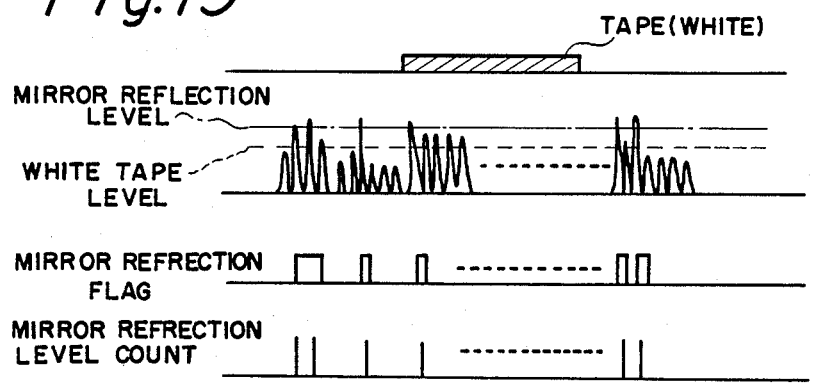
Figure 20:
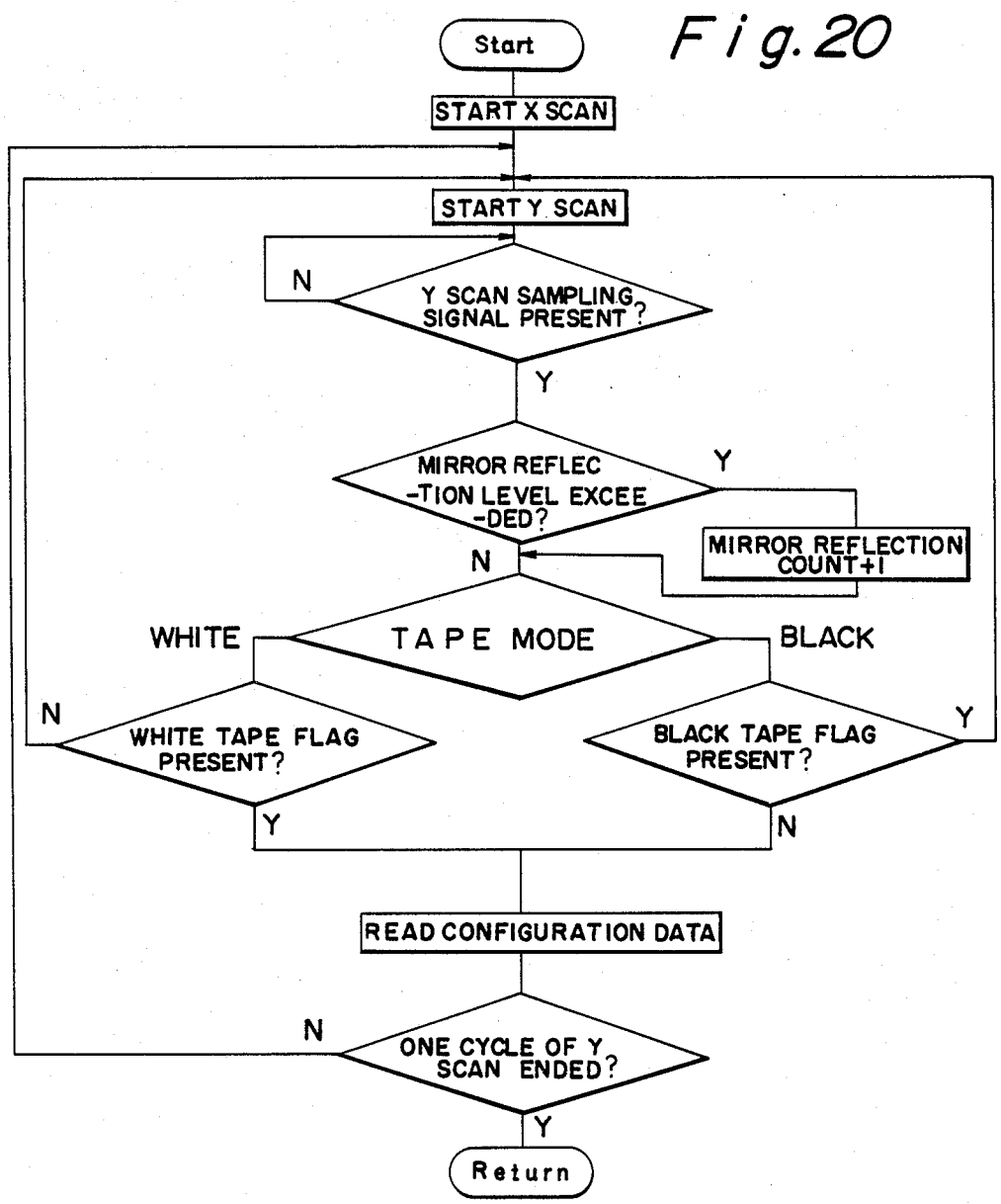
Figure 21:
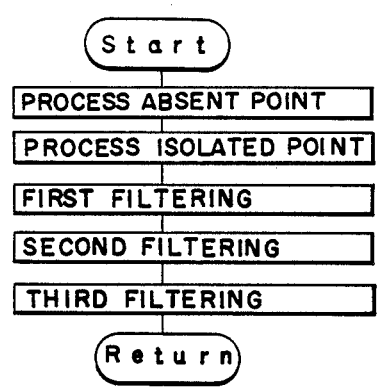
Figure 22:
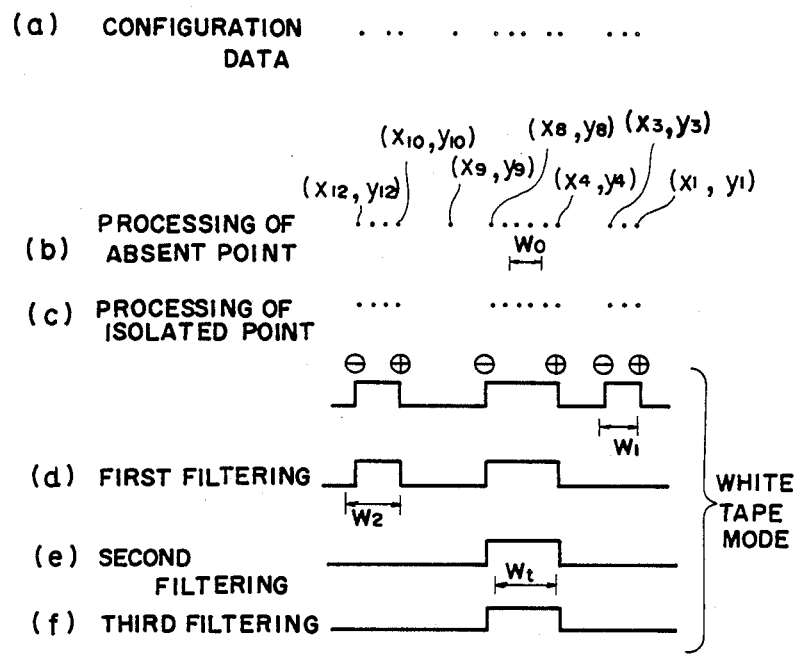
Figure 23:
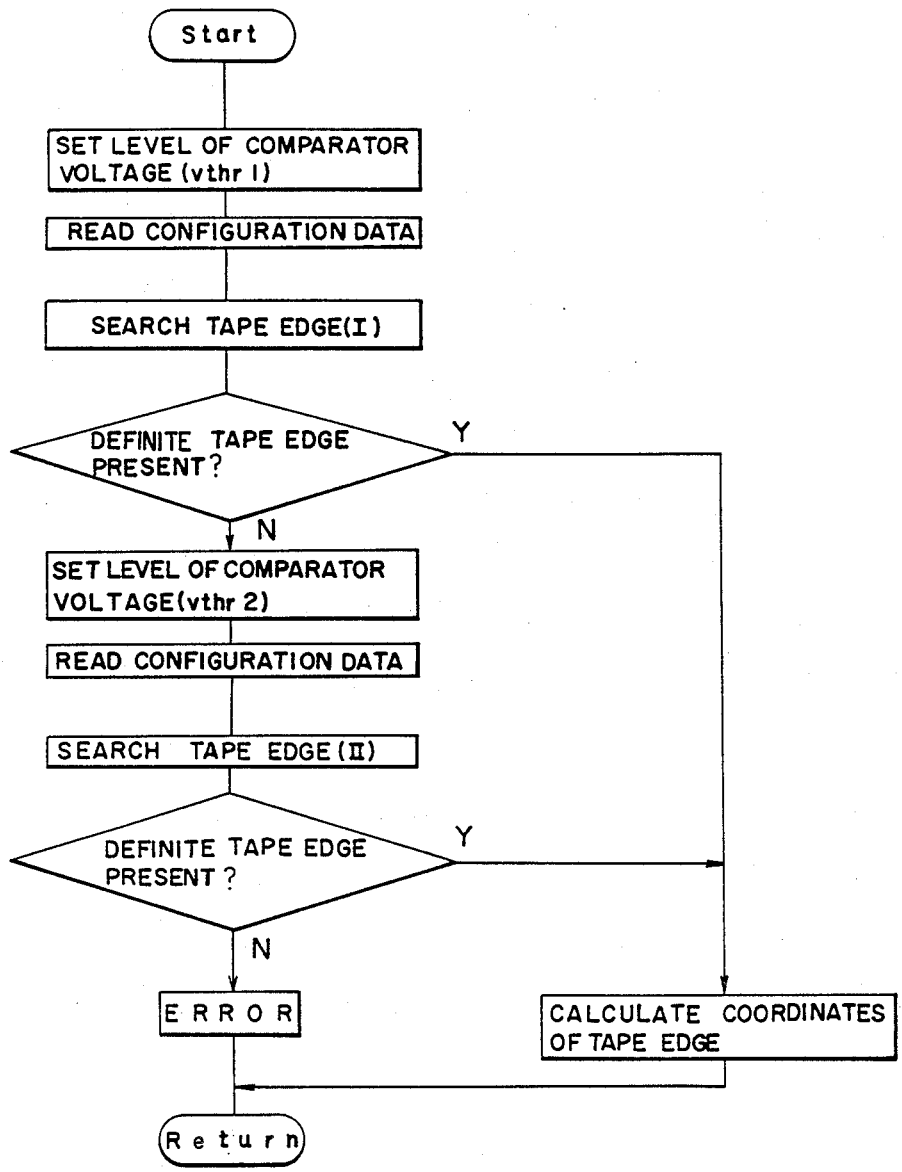
Figure 24:
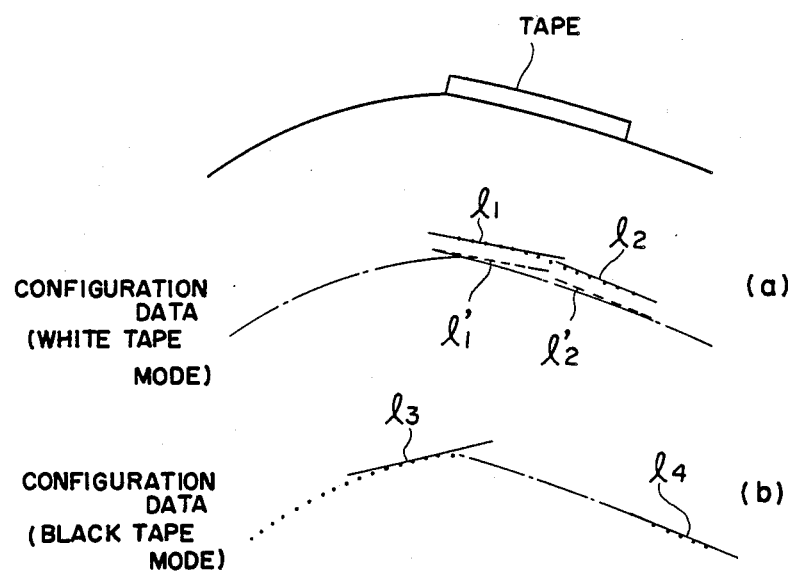

Graph (b) shows an output from a timing circuit;

Graph (c) shows an output from a delay circuit;

Graph (d) shows an output from the photodetector;

Graph (e) shows an output from a peak hold circuit;

Graph (f) shows an output from a sample hold circuit;

Graph (g) shows a variation in the amplitude of the X-axis beam deflector;

Graph (h) shows a combination of Graph (g), Graph (g) and the time axis in which the scale of the time axis of Graph (f) is made to correspond to that of Graph (g);

Graph (i) shows an output from a selector used in the apparatus of this invention;

Graph (j) shows an output from a leading edge detector used in the apparatus of this invention;

Graph (k) shows an output from a trailing edge detector used in the apparatus of this invention;

FIG. 9 is a graph illustrating the principle of detection of mirror reflection in accordance with this invention;

FIG. 10 is a flow chart of the detection of mirror reflection;

FIG. 11 is a flow chart of filtering for eliminating noise in accordance with the present invention;

FIG. 12 is a graph of a tape edge signal showing each step of the flow chart of FIG. 11;

FIG. 13 is a flow chart of another method of filtering in accordance with the invention;

FIG. 14 is an illustration used for explaining a method of obtaining the Y coordinates from the X coordinates of the tape edge in accordance with the invention;

FIG. 15 is an diagrammatic view of a second preferred embodiment of the present invention and is used with FIG. 1 for explaining each function of the second embodiment;

FIG. 16 includes Graphs (a) to (d) used for explaining the function of discriminating between the tape and the subject incorporated in the second embodiment, in which;

Graph (a) shows a signal output from the photodetector;

Graph (b) shows a sampling pulse produced from the signal output shown in Graph (a);

Graph (c) shows an output from each comparator;

Graph (d) shows an output from each flip-flop;

FIG. 17 includes Graphs (a) to (e) used for explaining the function of discriminating between the tape and the subject incorporated in the second embodiment, in which;

Graph (a) shows a signal output from the photodetector;

Graph (b) shows a sampling pulse produced from the signal output shown in Graph (a);

Graph (c) shows an output from each comparator;

Graph (d) shows an output from each flip-flop;

Graph (e) shows an inverted waveform of the output of Graph (d);

FIG. 18 is a flow chart for selectively reading data representing the tape or the subject in the second embodiment;

FIG. 19 is a graph used for explaining the principle of dectection of mirror reflection in the invention;

FIG. 20 is a flow chart of detection of mirror reflection performed in the invention;

FIG. 21 is a flow chart of processing absent points and isolated points to detect a cross-sectional configuration (of a tape edge);

FIG. 22 is an illustration used for explaining each step of the flow chart of FIG. 21;

FIG. 23 is a flow chart showing another method of filtering in accordance with the invention; and FIG. 24 is an illustration used for explaining a method of obtaining the coordinates of the tape edge in accordance with the invention.

DESCRIPTION OF THE PREFERRED EMBODIMENTS

FIGS. 1 and 2 illustrate a first preferred embodiment of the present invention. First of all, an apparatus for measuring the coordinates of a tape edge will be described below with reference to these Figures, each showing a functionally different portion of the apparatus constituting the first embodiment of the invention.

Referring first to FIG. 1, the apparatus includes a beam source 1, such as a laser, having a high level of directivity. A beam deflector 2a and an oscillating portion 2b constitute in combination an X-axis beam deflector 2 which is arranged to deflect and scan a beam of light in a direction along the X axis (hereinafter referred to simply as as "X scan"). A projecting lens 3 is disposed in such a manner that the focal point thereof coincides with the center of deflection of the X-axis beam deflector 2. An object 4 to be measured includes a subject 4a and a tape 4b stuck to the subject 4a. A light receiving lens 5 has an optical axis (hereinafter referred to as the "reception axis") which makes a certain angle of from 0° to 90° with the optical axis of the projecting lens 3 (hereinafter referred to as the "projection axis or Y axis") and which intersects the direction of the X scan at right angles. The light receiving lens 5 is adapted to focus light reflected from the object 4 onto a predetermined position.

Beam deflectors 6a, 6b and an oscillating portion 6c constitute in combination an Y-axis beam deflector 6. The Y-axis beam deflector 6 is disposed at a predetermined position on the reception axis which extends between the object 4 and an image forming plane on which an image is formed by the light receiving lens 5. The Y-axis beam deflector 6 is adapted to deflect and scan the light reflected from the object 4 in a direction perpendicular to the direction of the X scan (hereinafter referred to simply as a "Y scan"). A beam-spot detector 7 for detecting the position of a beam spot is constituted by an optical slit 7a having a gap 7d which is formed parallel to the direction of the X scan, a photodetector 7b, and a differentiating circuit 7c. The beam-spot detector 7 generates a predetermined trigger signal at the moment a beam spot passes the gap 7b.

An X-axis sampling circuit 8 samples and stores the X-scan signal which is transferred from the X-axis beam deflector 2 at the moment the beam-spot detector 7 generates a trigger signal. A Y-axis sampling circuit 9 samples and stores the Y-scan signal which is transferred from the Y-axis beam deflector 6 at the moment the beam-spot detector 7 generates a trigger signal. The measuring apparatus in accordance with the present invention further includes a display recorder 22, a detecting optical head 23, and a main controller 18 for controlling the apparatus.

Referring to FIG. 2, an envelope detecting circuit 101 is constituted by a peak hold circuit 102, a sample hold circuit 103, a timing circuit 104, and a delay circuit 105. Comparators 106, 107, 108, and 109 produce binary signals from an envelope detection signal which is generated by the envelope detecting circuit 101 in proportion to the quantity of light. These binary signals are utilized to distinguish between the tape 4b and the subject 4a. Selectors 111 and 112 are disposed so as to select a binary signal which corresponds to the color of the tape 4a. Leading-edge detectors 113, 115 and trailing-edge detectors 114, 116 are arranged to detect the edges of the tape 4a and actuate sampling circuits 117, 118 and 119, 120, respectively.

A method of measuring the coordinates of the edges of a tape by means of the apparatus having the above-described construction in accordance with the invention will be explained below in conjunction with the operational principles of two functions incorporated in the detecting optical head 23.

The detecting optical head 23 has the functions of measuring a cross-sectional configuration and of detecting the coordinates of tape edges.

The operational principle of the function of measuring a cross-sectional configuration, which is incorporated in the detecting optical head 23, will first be described below with reference to FIG. 1.

The beam source 1 emits a parallel beam of light which has a high level of directivity and which has substantially no divergence. The beam source 1 may be constituted by a combination of a point source and a lens, but it is common practice to use a gas laser or a semiconductor laser. The beam emanating from the beam source 1 enters the X-axis beam deflector 2, and is deflected and scanned over a predetermined angular range and at a scan frequency of $f_1$ in a direction perpendicular to the projection axis, that is, in a direction along the X axis if the projection axis represents the Y axis. Various devices of known types which utilize electro-optical effects, such as a tuning-fork oscillation mirror or a rotary polygon mirror, may be used as the X-axis beam deflector 2. As illustratively shown in FIG. 1, a galvanomirror which acts as the beam deflector 2a is driven by an externally disposed X deflection oscillator which acts as the oscillating portion 2b.

The beam which is deflected and scanned passes through the projection lens 3 whose focal point O' coincides with the center of deflection of the X-axis beam deflector 2. Thus, the beam is projected onto the object 4 in such a manner as to scan the boundary between the opposed surfaces of the subject 4a and the tape 4b at about right angles. In this manner, the deflected beam which diverges from the center of deflection in a sectoral form is converted by the projecting lens 3 into a band of light rays which are projected parallel to the projection axis, thereby effecting a deflected scan. Accordingly, the position of a beam spot relative to the X-axis direction can be primarily detected from the deflection angle of the X-axis beam deflector 2, irrespective of the distance from the object 4. In addition, a parallel beam of light is focused so as to minimize the diameter of a beam spot projected onto the object 4, thereby improving the resolution of the detected image. For instance, if the deflection angle of the beam deflector 2 is 0.1 rad and the focal length of the projecting lens 3 is 100 mm, the width of the deflected scan is 10 mm, irrespective of the distance from the object 4, and the diameter of the beam spot is about 0.1 mm on a portion of the object 4 which is near a focal point O on the side opposite to the beam deflector 2.

The light reflected from the object 4 passes along a the Y-Z plane in FIG. 1, makes a certain angle $\theta$ with respect to the projection axis, that is, the Y axis, and is then converged by the light receiving lens 5 whose optical axis passes through the focal point O of the projection lens 3 which is formed on its side facing the object 4 (hereinafter referred to as the origin O). The value of $\theta$ is typically $\pi/6$ to $\pi/4$ rad.

The light passing through the light receiving lens 5 is reflected from the beam deflector or deflecting mirror 6a of the Y-axis beam deflector 6, and is focused in the vicinity of a focal point O".

In the same way as with the above X-axis beam deflector 2, the Y-axis beam deflector 6 may be selected from several kinds of devices. By way of example, as shown in FIG. 1, the galvanomirror (including the coil portion 6a and the reflecting mirror (6b) is driven by the externally disposed Y-axis beam deflector 6. The Y-axis beam deflector 6 has a center of deflection which is located on the straight line between the origin O and the focal point O", and the deflection axis of the Y-axis beam deflector 6 is disposed parallel to the X-scan direction. The Y-axis beam deflector 6 may be disposed at a given position between the origin O and the focal point O", either before the light receiving lens 5 (deflection on the side on which the object is placed) or after the lens 5 (deflection on the side on which the image is formed). In the embodiment shown in FIG. 1, the Y-axis beam deflector 6 is located at a predetermined position between the light receiving lens 5 and the focal point O".

In this arrangement, the Y-axis beam deflector 6 is driven at a scan frequency $f_2$ which is sufficiently higher than the drive frequency $f_1$ of the X-axis beam deflector 2. Thus, the light reflected from the object 4 is focused by the light receiving lens 5, and is deflected in a direction parallel to the Y axis about the reception axis (this is hereinafter referred to as a "Y scan").

The beam which is deflected from the Y-axis beam deflector 6 is focused as a beam spot on the optical slit 7a of the beam-spot detector 7, which includes the focal point O" of the light receiving lens 5 having the origin O and which has a detecting surface perpendicular to the reception axis.

The beam-spot detector 7 has an axis which extends parallel to the X axis and which intersects the reception axis that includes the focal point O" (hereinafter referred to as the "Xi axis"). The detector 7 has two areas which are separated from each other by the axis; an $+y_i$ area and an $-y_i$ area in the embodiment shown in FIG. 1. If a beam spot is projected onto the Xi axis or if the center of the luminous energy of a beam having an enlarged spot diameter is located on that point, the beam-spot detector 7 is adapted to generate a predetermined signal. As illustratively shown in FIGS. 3A, 3B and 3C, the detector 72 may be constituted by a differential-slit arrangement, a differential photodiode or a differential prism. In the embodiment shown in FIG. 1, the beam-spot detector 7 is simply constituted by the optical slit 7a having an aperture which corresponds to the Xi axis, the photodetector 7b and the differentiating circuit 7c. The beam-spot detecting means has no afterimage. In addition, even if the projected beam spot is partially dimmer, it is possible to accurately detect the center of luminous energy thereof.

The function of detecting the position of a beam spot, which is incorporated in the first embodiment, will be described below with reference to FIGS. 4A to 4D.

Figure 4A:
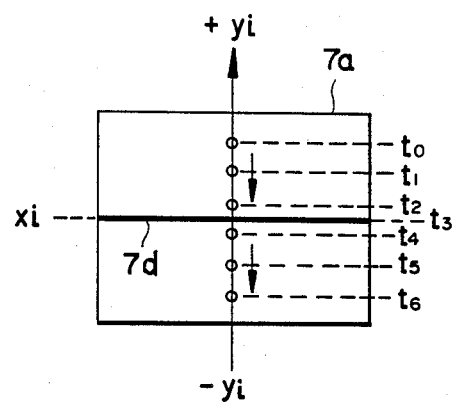
FIG. 4A is an illustration used for explaining the function of detecting the position of a beam spot in accordance with the invention and shows the travel of a beam spot on an optical slit.

As shown in FIG. 4A, a beam spot of a certain diameter travels along the optical slit 7a which has the gap 7d in a direction from $t_0$ to $t_6$.

Figure 4B:
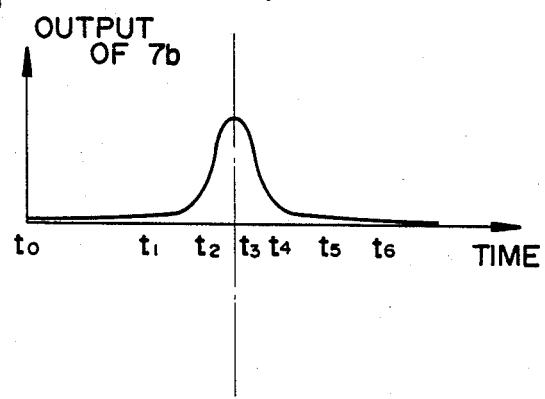
FIG. 4B is a graph used for explaining the function shown in FIG. 4A and shows an output from the photodetector.

Accordingly, as shown in FIG. 4B, at the time $t_3$ at which the substantial center of the beam spot coincides with the gap 7d, the quantity of light which passes through the gap 7d reaches a maximum and the output of the photodetector 7b also reaches a maximum.

Figure 4C:
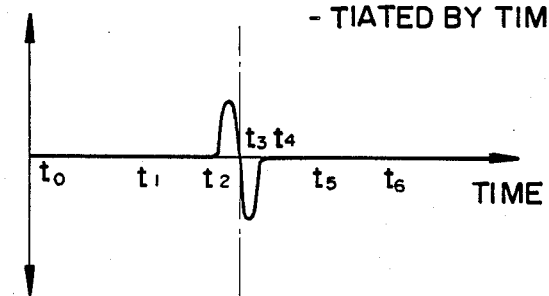
FIG. 4C is a graph used for explaining the function shown in FIG. 4A and shows the waveform which is obtained by differentiating the output from the photodetector with respect to time.

Referring to FIG. 4C which shows a signal waveform of the output of the photodetector 7b differentiated with respect to time, the signal waveform intersects the O-volt axis at the time $t_3$. The differentiating circuit 7c effects the differentiation shown in FIG. 4C and detects the zero-crossing, and outputs a signal such as that shown as an example in FIG. 4D.

Figure 4D:
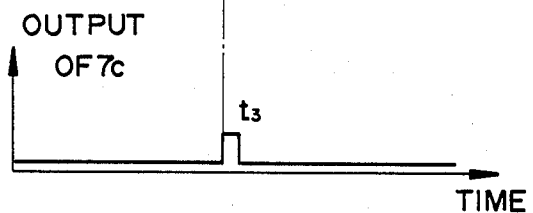
FIG. 4D is a graph used for explaining the function shown in FIG. 4A and shows an output from a differentiating circuit used in the invention.

As shown in FIG. 4D, the leading edge of the signal indicates that the center of the beam spot now coincides with the gap 7d.

Referring again to FIG. 1, the signal generated by the beam-spot detector 7 simultaneously actuates the X-axis sampling circuit 8 and the Y-axis sampling circuit 9 to cause the circuits 8 and 9 to sample their inputs. The X-axis sampling circuit 8 receives an output from the X deflection oscillator 2b of the X-axis deflector 2 while the Y-axis sampling circuit 9 receives an output from the oscillating portion 6c of the Y-axis beam deflector 6.

In this arrangement, in response to the signal from the beam-spot detector 7 during one X scan cycle, the cross-sectional configuration of the portion of the object 4 which is illuminated by the X-axis scanning beam is provided at each of the outputs of the X-axis sampling circuit 8 and the Y-axis sampling circuit 9. For instance, if the output of the X-axis sampling circuit 8 is connected to the X input of an X - Y oscilloscope (not shown) while the output of the Y-axis sampling circuit 9 is connected to the Y input, the X - Y cross section of the object 4 is displayed in relation to the origin of the coordinate axis which is the aforesaid origin 0.

This function (the function of measuring a cross section) is described in more detail below.

FIG. 5 shows the locus created by a beam spot focused on the optical slit 7a. In FIG. 5, Xi and $\pm Y_i$ correspond to the directions shown in FIG. 1. The X scan cooperates with the Y scan, which is sufficiently faster than the X scan, in causing the focused beam spot to start from the black spot shown in FIG. 5. The beam spot arrives at the white spot after half X scan cycle, then returns to the same black point. This motion is repeated in sequence. However, the cycle of the Y scan is sufficiently shorter than that of the X scan. Accordingly, in one Y scan cycle, the focused beam spot does not move far along the Xi axis on the optical slit 7a.

The distance measuring function which is performed by the above-described operation will be described below with reference to FIGS. 6A to 6I.

For brevity's sake, assumes that the X-axis beam deflector 2 stops and the beam emanating from the beam source 1 is projected onto the object 4 along a path corresponding to the projection axis, i.e., the Y axis.

Figure 6A:
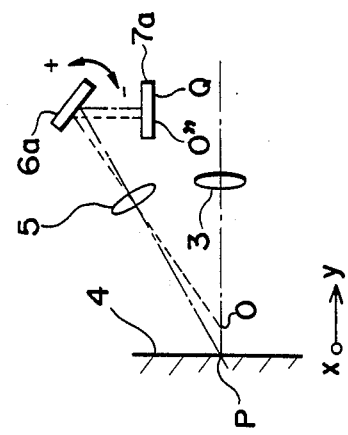
FIGS. 6A, 6B and 6C show variations in the position of a projected beam spot in accordance with changes in the position of an object to be measured.
Figure 6B:
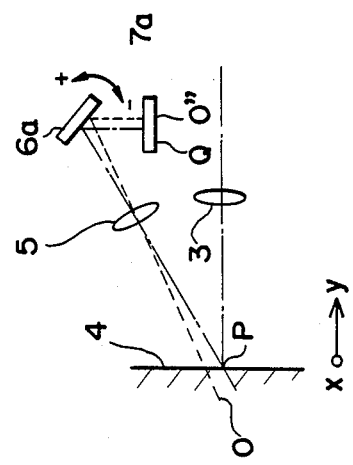
Figure 6C:
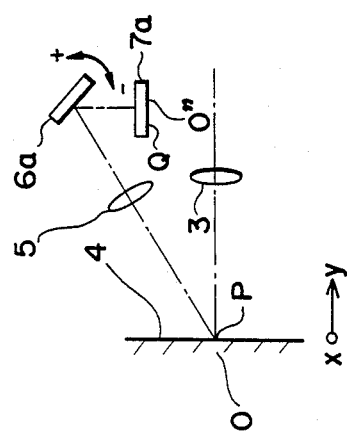
Figure 6D:
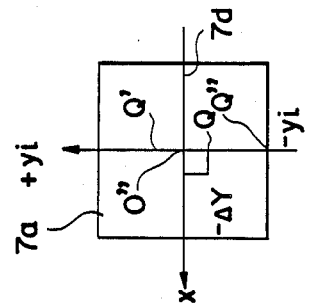
FIGS. 6D, 6E and 6F respectively correspond to FIGS. 6A, 6B and 6C and show variations in the position of the beam spot projected on the optical slit.
Figure 6E:
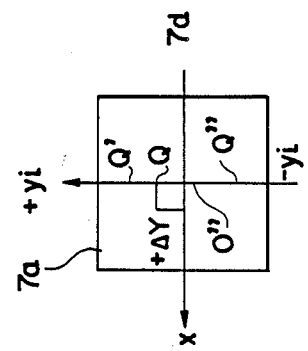
Figure 6F:
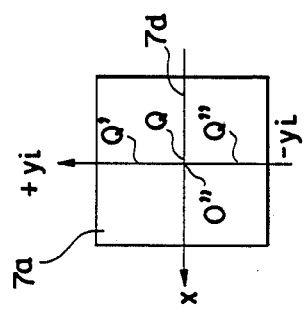

FIG. 6A shows a state wherein an intersection point P of the Y axis on the object 4 corresponds to the origin O. Therefore, a projected beam spot also corresponds to the point P (hereinafter referred to simply as a "projected spot P"). FIG. 6B shows a state wherein the object 4 is displaced from the position of FIG. 6A toward the detecting optical system, and FIG. 6C shows a state wherein the object 4 is displaced from the position of FIG. 6A in the direction away from the detecting optical system. FIGS. 6D, 6E and 6F each show the position of a projected beam spot Q which is focused on the optical slit 7a, where FIGS. 6D, 6E and 6F respectively correspond to FIGS. 6A, 6B and 6C.

If the projected beam spot P coincides with the origin O, as shown in FIG. 6D, the focused image Q also coincides with the focused image O" and all of the images are in the gap 7d. In this case, the Y-axis beam deflector 6 deflects and scans the beam along the reception axis. Accordingly, the focused image Q moves between Q' and Q" at a scan frequency of $f_2$. The point Q in this Figure represents the center of the locus of the focused beam spot which is deflected.

Figure 6I:
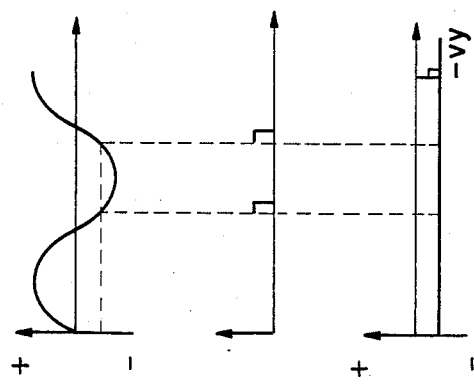
FIGS. 6G, 6H and 6I respectively correspond to FIGS. 6A, 6B and 6C and show the deflection angle of a Y-axis beam deflector, an output from the beam-spot detector and an output from a Y-axis sampling circuit.
Figure 6H:
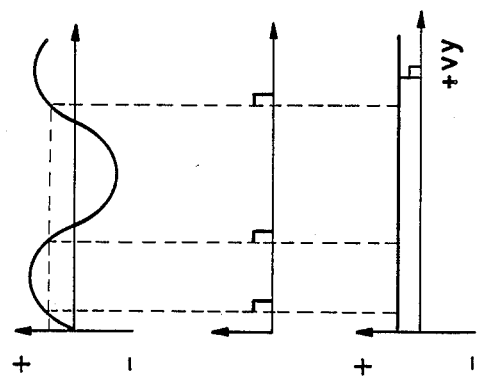
Figure 6G:
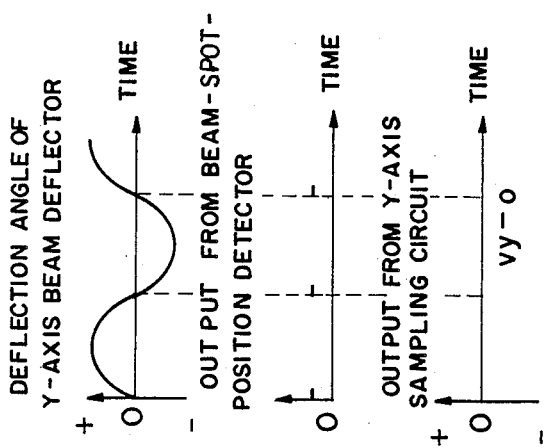

FIG. 6G shows three graphs having three axes whose origins are aligned. The top graph represents variations in the deflection angle of the Y-axis beam deflector 6 with respect to time. The middle graph represents the output of the beam-spot detector 7 with respect time. The output is a signal obtained from a beam which passes through the optical slit 7a, is optically converged by the photodetector 7b, and is then processed by the differentiating circuit 7c. The bottom graph represents the output of the Y-axis sampling circuit 9 which is actuated in response to this signal. As can be seen from FIG. 6G, if the origin O coincides with the projected spot P as shown in FIGS. 6A and 6D, the focused image Q corresponding to the projected spot P passes through the optical slit 7a when the deflection angle shown in the top graph of FIG. 6G is $\phi$. Therefore, the beam-spot detector 7 provides an effective level of signal output. The Y-axis sampling circuit 9 is actuated by the signal of the beam-spot detector 7 to sample and store the output of the Y-deflection oscillator 6c which is connected to the input of the circuit 9. The output of the Y-deflection oscillator 6c and the deflection angle of the Y-axis beam deflector have a one-to-one correspondence. Therefore, the level of output from the Y-axis sampling circuit 9 is zero in this case.

In contrast, if the object 4 is displaced in the positive along the Y axis as shown in FIGS. 6B and 6E, or if the object 4 is displaced in the negative direction along the Y axis as shown in FIGS. 6C and 6F, it is clear that the focused image O" corresponding to the origin O does not coincide with the focused image Q. Therefore, unless the Y-axis beam deflector 6 is correspondingly deflected, the focused image Q will not pass through the gap 7d of the optical slit 7a. For this reason, as shown in FIGS. 6H and 6I, the focused image Q passes through the gap 7d of the optical slit 7a at a time at which the sinusoidal curve representing the deflection angle of the Y-axis beam deflector 6 is not at zero on the time axis, thereby causing the beam-spot detector 7 to produce an output pulse. In response to this signal, the Y-axis sampling circuit 9 is actuated to sample and output the non-zero output provided by the Y-deflection oscillator 6c which shows a one-to-one correspondence with the deflection angle of the Y-axis beam deflector 6. In other words, if the object 4 is displaced in the position direction along the Y axis, as shown in FIGS. 6B, 6E and 6H, the beam-spot detector 7 generates a sampling signal to correspond to a positive-voltage portion of the Y-deflection oscillator 6c, and the Y-axis sampling circuit samples and stores the positive voltage. If the object 4 is displaced in the negative direction along the Y axis, as shown in FIGS. 6C, 6F and 6I, an operation exactly opposite to that described above is performed, so the description thereof is omitted. The output voltage of the Y-axis sampling circuit can be easily converted into the deflection angle of the Y-axis beam deflector 6 which causes the focused image Q to coincide with the gap 7d of the optical slit 7a. In addition, it will be appreciated that such an output voltage could be converted into the distance along the Y axis between the origin O and the intersection point P on the surface of the object 4 with respect to the Y axis, that is, the associated Y coordinate. The distance between the origin O and the detecting optical head 23, for example, the distance OH between the origin O and the center H of the projecting lens 3, is physically determined. Accordingly, it will be appreciated that the output voltage of the Y-axis sampling circuit 9 can be easily converted into the distance between the point P on the object 4 and the detecting optical head 23.

In the above-described manner, the distance between the object 4 and the detecting optical head 23 is calculated at least once in a half Y scan cycle. In this state, as shown in FIG. 5, the X-axis beam deflector 2 is driven at the scan frequency of $f_1$ which is sufficiently lower than that of the Y-axis beam deflector 6. In this case, while the focused image Q corresponding to the projected spot P is traveling a slight distance in the Xi-axis direction, one Y scan cycle is completed. Thus, at a time t at which the focused image Q passes through the gap 7d, the beam-spot detector 7 generates a sampling pulse to cause the Y-axis sampling circuit 9 to hold the voltage corresponding to the distance between the object 4 and the detecting optical head 23.

The sampling pulse supplied from the beam-spot detector 7 also actuates the X-axis sampling circuit 8, and causes the circuit 8 to sample and store the output voltage of the X-deflection oscillator 2b of the X-axis beam deflector 2 at that time t. In the same way as with the Y-axis sampling circuit 6, the output voltage of the X-axis sampling circuit 2 can also be easily converted into the deflection angle of the X-axis beam deflector 2. In addition, it is evident that such an output voltage can be converted into the distance between the projected spot on the object 4 and the Y axis which is the projection axis, that is, the associated X coordinates.

In the above-described manner, the X Y coordinates of the locus of the projected spot P which travels on the object 4 sequentially in time during one X scan cycle are output in each Y scan cycle. In the X Y coordinates, the point O is the origin, the X axis being the direction of the X scan and the Y axis being the direction of the axis of the projected spot.

Figure 7A:
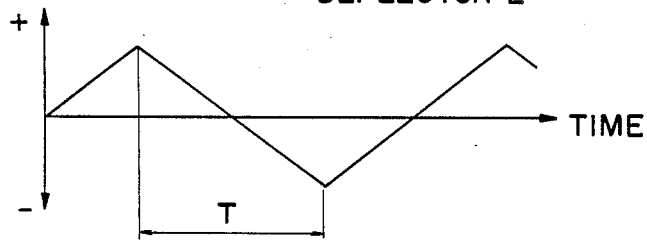
FIG. 7A is a graph showing the deflection angle of an X-axis deflector used in this invention.
Figure 7B:
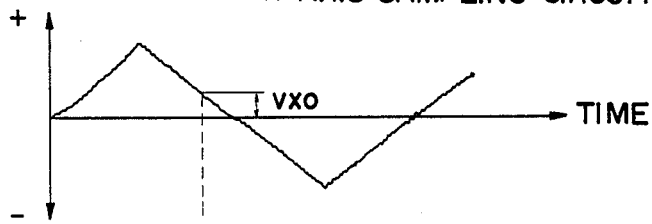
FIG. 7B is a graph showing an output from an X-axis sampling circuit used in this invention.
Figure 7C:
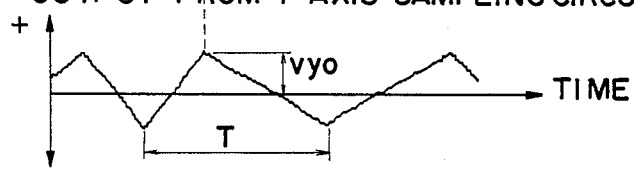
FIG. 7C is a graph showing an output from a Y-axis sampling circuit used in this invention.

FIG. 7A is a graph showing variations in the deflection angle of the X-axis beam deflector 2 with respect to the time axis and illustrates a simplified triangle waveform used for driving the deflector 2. T represents the period of a half cycle of the triangle waveform. FIGS. 7B and 7C respectively illustrate variations in the outputs of the X-axis sampling circuit 8 and the Y-axis sampling circuit 9 with respect to time, with the origins of the time axes of these Figures being aligned with that of FIG. 7A.

Specifically, the cross-sectional configuration of the object 4 which is obtained by the X scan is output as shown in FIGS. 7B and 7C.

It is to be noted that, although the X-axis oscillator, the Y-axis oscillator and the sampling circuit are employed for the purpose of illustrative description of the embodiment, various other kinds of components may of course be utilized. For example, it is possible to employ a combination of a clock oscillator and a counter/latch circuit, a combination of an A/D converter and a latch circuit or any other combination that is arranged to be actuated by a sampling pulse from the beam-spot detector 7 to sample and store information representative of the deflection angles of the X-axis beam deflector 2 and the Y-axis beam deflector 6. In this case, the X and Y coordinates are sequentially stored as digital data in a storage device. Thereafter, a digital computer performs calculations on the digital data.

The operational principle of the function of detecting the coordinates of edges of a tape which is incorporated in the detecting optical head 23 will be described below the reference to FIGS. 2 and 8 (Graphs (a) through (k)). It is assumed here that the object 4 is constituted by the subject 4a of a low reflectance and the tape 4b of a high reflectance which is stuck to the surface of the subject 4a. This function operates simultaneously with the function of measuring the cross-sectional configuration depicted in FIG. 1.

Figure 8:
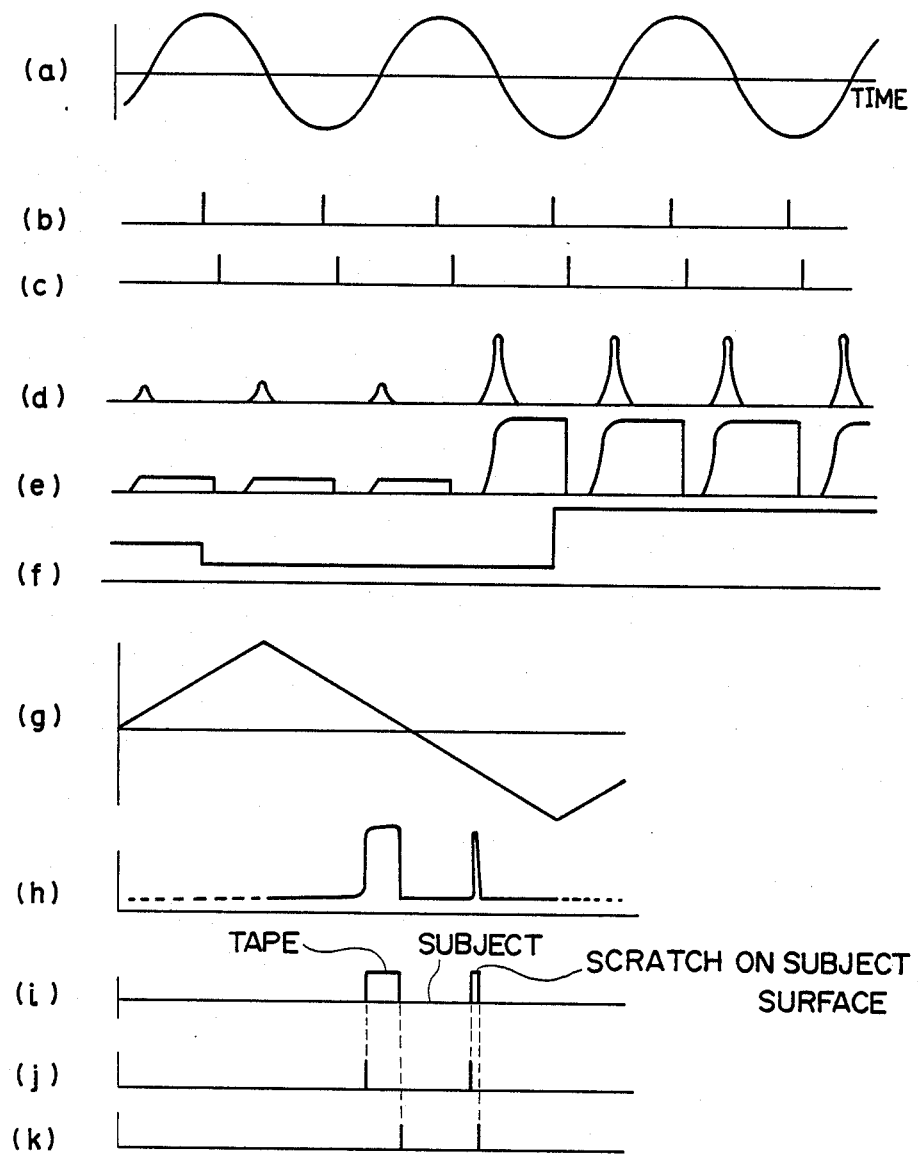
FIG. 8 includes Graphs (a) to (k) used for explaining the function of detecting the coordinates of tape edges which is incorporated in an apparatus of the invention, in which Graph (a) shows a variation in the amplitude of the Y-axis beam deflector.

First, a signal (FIG. 8, Graph (f)) having an amplitude proportional to the reflectance of the surface of the object 4 is produced by the envelope detecting circuit 101 on the base of an output (FIG. 8, Graph (d)) from the photodetector 7b. More specifically, in this embodiment, a timing circuit 104 produces a signal (FIG. 8, Graph (b)) synchronized with the maximum amplitude portions of a variation in the amplitude of the Y-axis beam deflector 6 (FIG. 8, Graph (a)); and a slightly delayed signal (FIG. 8, Graph (c)) which is obtained by passing the signal (FIG. 8, Graph (b)) through a delay circuit 105. Then, a peak hold circuit 102 produces a signal (FIG. 8, Graph (e)) from a signal (FIG. 8, Graph (d)). A sample hold circuit 103 is actuated to sample the output of the peak hold circuit 102 in response to the signal of Graph (d) of FIG. 8 while the peak hold circuit 102 is reset in response to the signal of FIG. 8, Graph (e). Thus, a signal shown in Graph (f) of FIG. 8 is obtained from the signal of Graph (e) of FIG. 8. Graph (h) of FIG. 8 is a graph in which the scale of the time axis of Graph (f) is made to correspond to that of the signal (g) representative of the amplitude of the X-axis beam deflector 2 in correspondence with the amplitude of the X-axis beam deflector 2 of Graph (g) of FIG. 8.

The signals thus obtained are compared with predetermined levels of voltage in comparators 106, 107, 108 and 109, and are converted into associated binary signals. The comparators 106 and 108 are designed for a tape of a high-reflectance type while the comparators 107 and 109 are designed for a tape of a low-reflectance type. Prior to measurement, a user selects a desired tape mode through the selector switch (not shown) connected to the main controller 18. In response to the signal which is supplied from the main controller in correspondence with the selected state of the switch, either one of binary signals for tape of a high-reflection type and for a tape of a low-reflectance type is applied to the succeeding circuit through the comparators 111 and 112. Referring to Graph (i) of FIG. 8, the high-level portion of the output from the selector 111 (112) represents the fact that the beam is scanning the tape while the low-level portion of the output from the same represents the fact that the beam is scanning the subject. The leading-edge detector 113 (115) and the trailing-edge detector 114 (116) convert outputs from the selectors 111 and 112 into two kinds of signal representative of the positions of edges of a tape, i.e., a leading-edge timing signal (FIG. 8, Graph (j)) and a trailing-edge timing signal (FIG. 8, Graph (i)). Sampling circuits 117, 118, 119 and 120 are actuated by these timing signals, and thus the X coordinates of each of the tape edges are read into the main controller 18.

In this case, the object 4 may incline with respect to the detecting optical head 23 to cause mirror reflection, or the surface of the subject 4a may have a high reflectance because of its metal surface or metallic coating. Therefore, light having an intensity greater than that of the white tape 4b might enter the detecting optical head 23. At this time, the leading-edge and trailing-edge timing signals may be erroneously detected. To obviate this erroneous detection, a comparator 121 having a level which is little higher than the level of the white tape 4b is disposed so that the presence and absence of mirror reflection can be detected. However, since the actual state of mirror reflection is greatly influenced by the state of a surface to be measured, the level of reflection becomes non-uniform as shown in FIG. 9. Accordingly, it is possible to determine whether or not measurement can be performed, by detecting the number of the Y scans which exceed the level of mirror reflection while n tims of the Y scans are being performed in one X scan cycle. FIG. 10 is a flow chart of the counting of the number of mirror reflection levels which appear in one X scan cycle.

Two comparators are provided for a tape of a high-reflectance type and tape of a low-refectance type, respectively, and each of the comparators is provided with a different level of reference voltage. Therefore, even if the quantity of light reflected from the tape 4b and the subject 4a changes due to variations in the angle that the object 4 makes with the detecting optical head 23, it is possible to positively detect the timing signals The following is a description of an example of arithmetic operations on the two-dimensional coordinates of the edges of a tape which are performed by a computer program incorporated in the main controller 18 on the basis of the thus-obtained set of data representing the cross-sectional configuration and data representing the X coordinates of the edges of the tape.

The tape edges can be detected through the above-described circuits. However, the reflectance of the object is actually irregular because of the non-uniformity of the surface of the object or that of the surface of the tape. Therefore, as shown in FIG. 8I, the signal waveform representing the tape edges may contain noise. Accordingly, it becomes necessary to eliminate the noise in order to enable positive detection of the tape edges.

FIG. 11 is a flow chart showing the routine of elimination of noise and FIG. 12 is a graph of tape-edge signals showing the sequence of the operation which is executed in accordance with the flow chart.

The X coordinates of the tape edges, which is read into the main controller 18, are separated into the coordinates representing the leading edge of the tape (hereinafter, a "+edge") and the coordinates representing the trailing edge of the same (hereinafter, a "− edge"), and they are stored in associated memories. The distance between the X coordinates of the values of the +and − edges stored in the memories are calculated. If the result is equal to or less than a width which is a reference value, it is judged to be a noise. Thus, the values of the +and − edges in this case are erased from the memories. For instance, assumes that a + edge memory stores the following set of data in the order of (xeu$_0$, xeu$_1$, xeu$_2$, . . . , xeu$_n$); and a − edge memory stores the following set of data in the same order:

(xel$_0$, exl$_1$, xel$_2$, . . . , xel$_n$).

When the following calculations are performed:

$$xeu_0 - xel_0$$
$$xel_0 - xel_1$$
$$xeu_1 - xel_1$$
$$\cdot$$
$$\cdot$$
$$xeu_n - xel_n,$$

if xeu$_1$−xel$_1$≦d$_0$ (d$_0$ : a reference value), xeu$_1$ and xel$_1$ are erased from the +and − edge memories. Graph (b) of FIG. 12 shows the tape-edge signal which is filtered by a filter d$_0$. This tape-edge signal is in turn processed in the same manner as described above on the basis of a second reference value d$_1$ (>d$_0$), thereby erasing the values representing the tape edges that are not more than d$_1$. Graph (c) of FIG. 12 shows the result of this processing. Finally, the width of the tape is checked on the basis of the tape-edge signals from which noise is eliminated in this manner. In this case, xeu−xel is only checked, but, since xel−xeu does not represent the tape, it is not checked. Graph (d) of FIG. 12 shows the tape-edge signal which is subjected to this processing. In this manner, the tape edges can be detected by repeating the above-described filtering.

It is to be noted that, if there is a great variation in the angle that the object 4 makes with the detecting optical head 23, no definite tape may be obtained. In this case, however, if the comparator voltages are switched to different voltage levels to read out the tape-edge signals, desired definite tape edges can be obtained by performing similar filtering (FIG. 13).

A method of obtaining the Y coordinates associated with the thus-obtained X coordinates of the tape edges is described below with reference to FIG. 14. The data representing the cross-sectional configuration of the object is divided into a first set of data representing a tape area I and a second set of data representing a subject area II. A method of least squares is used to calculate approximate straight lines l$_1$ and l$_2$ or approximate hyperbolas which pass through the data points contained in the respective areas. The Y coordinates of the tape edges are obtained by calculating the Y coordinates corresponding to the X coordinates of the tape edges along the approximate straight lines l$_1$ and l$_2$ or the approximate hyperbolas.

In a case where the Y coordinates of the tape edges are to be calculated from the approximate straight line l$_1$ passing through the data points contained in the tape area I, an error equivalent to the thickness of the tape is added. It will be appreciated, however, that this error can be easily compensated for by previously measuring the thickness.

A second embodiment of the present invention will be described below with reference to FIGS. 1 and 15. The second embodiment is designed to selectively measure portions of a high reflectance and a low reflectance of an object which is located within the visual field of measurement, thereby obtaining data representing a desired cross-sectional configuration. The end points (tape edges) of the obtained configuration data are discriminated as characteristic points, and the coordinates of the characteristic points are measured.

In the second embodiment, the function of measuring a cross-sectional configuration incorporated in the detecting optical head 23 is the same as that of the previously-described first embodiment as shown in FIG. 1. The portion of the detecting optical head 23 which functions to detect the coordinates of tape edges is arranged as shown in FIG. 15.

Referring to FIG. 15, the comparators 106, 107, 108 and 109 produce binary signals which are utilized to divide the quantity of reflected light obtained through the photodetector 7b into the light reflected from the tape and the light reflected from the subject. The comparators 111 and 112 select binary signals corresponding to the color of a tape (for example, white or black). Flip-flops 133 and 132 hold the binary signals. The comparator 121 detects mirror reflection, and a flip-flop 133 holds the detected mirror reflection.

The operational principle of the function of detecting the coordinates of the edges of a tape incorporated in the detecting optical head 23 will be described below with reference to FIG. 15. This function operates simultaneously with the function of measuring a cross-sectional configuration shown in FIG. 1, and controls the latter.

It is assumed here that the object 4 is constituted by the subject 4a having a low reflectance and the tape 4b having a high reflectance (hereinafter, a "white tape") which is stuck to the subject 4a. Graph (a) of FIG. 16 shows the output which is provided by the photodetector 7b in this state.

This output is compared with predetermined levels of voltage in the comparators 106, 107, 108 and 109, and are converted into associated binary signals. The comparators 106 and 108 are designed for white tape while the comparators 107 and 109 are designed for black tape. Prior to measurement, the user selects a desired tape mode through the selector switch (not shown) connected to the main controller 18. Thus, a binary signal representative of either white tape or black tape is selected through the comparators 111 and 121 in response to the signal which is supplied from the main controller 18 in correspondence with the selected state.

When the maximum quantity of light of the beam-spot detector exceeds a predetermined voltage level, the comparator 111 (112) outputs a high-level signal, but, when the maximum quantity does not exceed the predetermined voltage level, the comparator 111 (112) outputs a low-level signal (FIG. 16, Graph (c)). These outputs are supplied to the D type flip-flops 131 and 132. When the flip-flops 131 and 132 are triggered by the sampling signal (FIG. 4, Graph (d) and FIG. 16, Graph (b)) which is obtained from the output (FIG. 4, Graph (b) and FIG. 16, Graph (a)) of the photodetector 7b, they output the signal shown in Graph (d) of FIG. 16. The high-level portion of this signal output represents the fact that the beam is scanning the white tape 4b, and the low-level portion represents the fact that the beam is scanning the subject 4a.

The following is a description of a method of controlling the function of measuring a cross-sectional configuration. This control is performed by a computer incorporated in the main controller 18 in accordance with the flow chart shown in FIG. 18. The computer starts the X scan to cause the beam to scan in the direction of the X axis and at the same time the Y scan to detect the position of the beam spot. When the computer detects a Y-scan sampling signal, it determines whether the output of the flip-flop is high or low. If it is judged that the output is high (a white-tape flag is detected), the computer reads data out of the X-axis sampling circuit and the Y-axis sampling circuit. However, if it is judged that the output is low, the computer reads no data. In this manner, until one X scan cycle is completed, the Y scan is repeated many times, and, only while the beam is scanning the white tape in the direction of the X axis, the configuration data is read.

As shown, while the white tape is being scanned, a void (absent point) may be contained in the obtained data. This is because the reflectance of the white tape is reduced due to a contamination of the surface or wrinkles in the same.

In contrast, it is assumed here that the object 4 is constituted by the subject 4a of a high reflectance and the tape 4b of a low reflectance (hereinafter a "black tape") which is stuck to the subject 4a. In this case, the black-tape comparator 107 and 109 are selected through the selectors 111 and 112, and the output shown in FIG. 17D is produced. The high-level portion of this output represents the fact that the beam is scanning the subject 4a while the low-level portion represents the fact that the beam is scanning the black tape.

In Graph (e) of FIG. 17, logic corresponding to the black tape is matched to logic corresponding to the white tape by reversing logic. In this case, while the subject is being scanned, the computer reads the configuration data. As shown, while the black tape is being scanned, data is partially read. This is because the reflectance of the surface is increased due to scratches on the surface or wrinkles on the same.

Two comparators are provided for the white and black tapes and each of the comparators has a different voltage level. Therefore, if the quantity of light reflected from the tape and the subject is greatly changed due to a great variation in the angle that the object 4 makes with the detecting optical head 23, it is possible to positively produce a signal.

In this case, the object 4 may incline with respect to the detecting optical head 23 to cause mirror reflection, or the surface of the subject 4a may have a high reflectance because of its metal surface or metallic coating. Therefore, light having an intensity greater than that of the white tape 4 might enter the detecting optical head 23. At this time, a white tape flag (FIG. 16, Graph (d)) may be erroneously detected. To obviate this erroneous detection, the comparator 121 having a level which is little higher than the level of the white tape as well as the flip-flop 133 are disposed so that the presence and absence of mirror reflection may be detected. The operations of the comparator 121 and the flip-flop 133 are the same as that in the case of the white tape.

However, since the actual state of mirror reflection is greatly influenced by the state of a surface to be measured, the level of reflection becomes non-uniform, i.e., irregular as shown in FIG. 19.

Accordingly, it is possible to determine whether or not measurement can be performed, by detecting the number of the Y scans which exceed the level of mirror reflection while n times of the Y scans are being performed in one X scan cycle. FIG. 20 is a flow chart of the counting of the number of mirror reflection levels which appear in one X scan cycle.

The following is a description of an example of arithmetic operations on the two-dimensional coordinates of the edges of a tape which are performed by a computer program incorporated in the main controller 18 on the basis of the thus-obtained set of data representing the partial cross-sectional configuration.

Ideally, the end points contained in the data representing the cross-sectional configuration are used as tape-edge data. However, actually, the level of the signal light varies under the influence of the state of the surface of the tape. Therefore, the resultant cross-sectional configuration data contains absent points and isolated points, and this makes it difficult to obtain a definite tape edge. Accordingly, it is necessary to process the absent points and isolated points in order to detect tape edges.

The following is a description of the procedure for such a processing. FIG. 21 is a flow chart used for explaining the procedure and FIG. 22 is a graph showing a process sequence for processing tape-edge data.

M-number of pieces of data $(x_i, y_i)$ representing a cross-sectional configuration are read into the main controller 18 and are stored in the memory, and then the distance $x_i - x_{i+1}$ between adjacent points in the X-scan direction is calculated. Any adjacent point that exceeds a reference value is stored as a candidate point in the memory. By way of example, it is assumed here that the following data representing a cross-sectional configuration is stored in the memory:

$(x_1, y_1), (x_2, y_2), (x_3, y_3), \ldots, (x_m, y_m)$ $(x_1 > x_2 > \ldots > x_m)$.

When the following calculations are performed:

$$\begin{aligned} x_1 - x_2 \\ x_2 - x_3 \\ x_3 - x_4 \\ \vdots \\ x_{m-1} - x_m \end{aligned}$$

if $x_3 - x_4 \leq w_0$ ($w_0$: a reference value), the resultant data is regarded as an absent point and it is judged, therefore, that the data represents a continuous pattern of points.

On the other hand, if $x_3 - x_4 > w_0$, the point $(x_3, y_3)$ and the point $(x_4, y_4)$ are stored in the memory as candidate points of the edge of the tape. At this time, if the white-tape mode is selected, $(x_3, y_3)$ and $(x_4, y_4)$ are separately stored as a trailing edge of the tape and as a leading edge of the tape, respectively. If the black-tape mode is selected, $(x_3, y_3)$ and $(4, y_4)$ are separately stored as a leading edge of the tape and as a trailing edge of the tape, respectively. The start point $(x_1, y_1)$ and the end point $(x_m, y_m)$ are also stored in the memory as candidate points of the tape edge.

The thus-obtained candidate points of the tape edge are checked in order to determine whether or not the data represents a continuous pattern of points. For example, if the data includes a series of three or more points, the data is regarded as a candidate point of the tape edge. If not, the data is regarded as an isolated point; therefore, it is ignored. In order to determine whether or not the points are continuously arranged, judgement is made, through calculations, with respect to whether or not the distance between adjacent points is below a reference value ($w_Q$). For example, if $x_4 - x_5 \leq w_Q$ and $x_5 - x_6 \leq w_Q$, it is judged that $x_4$, $x_5$ and $x_6$ are continuously arranged, and $x_4$ is selected as a candidate point of the tape edges. In this manner, the absent points and the isolated points are processed. It is assumed here that the thus-processed candidate points of the tape edges are arranged in the memory as follows:

$(x_1, y_1), (x_3, y_3), (x_4, y_4), (x_8, y_8), (x_{10}, y_{10}), (x_{12}, y_{12})$, ..., $(x, y)$.

In this stage, it is possible to erase absent points and isolated points which are spaced at relatively narrow intervals. However, since absent points and isolated points which are spaced at relatively wide intervals less than the width of the tape have not yet been erased, the following additional filtering is performed.

Calculations are performed on the distance between the the value of the leading tape edge (hereinafter an "+ edge") of the candidate points of the tape edge stored in the memory and those of the trailing tape edge (hereinafter an "− edge") of the candidate points of the same, that is, the distance between the X coordinates of the + edge and the − edge. If the resultant distance is less than a reference value, the + edge and the − edge are erased from the associated memories. By way of example, it is assuemd here that, in the white-tape mode, the + edge memory stores the following data:

$\{(x_1, y_1), (x_4, y_4), (x_{10}, y_{10}), \ldots\}$; and if the − edge memory stores the following data:

$\{(x_e, y_3), (x_8, y_8), (x_{12}, y_{12}), \ldots\}$.

When the following calculations are performed, $$x_1 - x_3$$
$$x_3 - x_4$$
$$x_4 - x_8$$
$$\vdots$$

if $x_1 - x_3 \leq w_1$ ($w_1 > w_Q$), the candidate points $(x_1, y_1)$, $(x_3, y_3)$ of the tape edges are erased. The tape-edge data which is passed through a filter of $w_1$ is shown in Graph (d) of FIG. 22.

This tape-edge data is subjected to the same processing as described above on the basis of a new reference value $w_2$ ($w_2 > w_1$), thereby erasing the tape-edge data which is not more than $w_2$. The result of this processing is shown in Graph (e) of FIG. 22.

Finally, the width of the tape is checked on the basis of the tape-edge data from which noise is removed in this manner. In this case, (the X coordinate of the +edge) −(the X coordinate of the − dge) is checked, but (the x coordinate of the − edge)−(the X coordinate of the + edge) is not checked because the former relation does not represent the tape. FIG. 22 shows the tape-edge data which is subjected to this processing. In this manner, the edges of the tape can be detected by repeating the above-described filtering.

It is to be noted that, in the black-tape mode, the +edge memory stores the following data:

$\{(x_3, y_3), (x_8, y_8), (x_{12}, y_{12}), \ldots\}$; and the − edge memory stores the following data:

$\{(x_1, y_1), (x_4, y_4), (_{10}, y_{10}), \ldots\}$.

These sets of data are filtered in the same manner as the filtering used in the white-tape mode, thereby detecting the edges of the tape. In this embodiment, filtering is repeated three times, but the times of filtering and a width to be filtered may be suitably selected in accordance with various factors such as the condition of noise.

If there is a great variation in the angle that the object 4 makes with the detecting optical head 23, no definite tape edge may be obtained. In this case, the levels of the comparator voltages may be changed. If the configuration data is read on the basis of the thus-changed voltage level and the same filtering as described above is performed, it is possible to obtain definite tape edges (FIG. 23).

The coordinates obtained through filtering may be used as the coordinates of the tape edges. However, since the upper surface of the tape is measured in the white-tape mode, the result of measurement may contain an error equivalent to the thickness of the tape. In addition, the result might contain an error derived from the irregularity of the surface to be measured, a measurement error and the like. Therefore, it is preferable to compensate for these errors.

The following is a description of a method of calculating the coordinates of tape edges while compensating for such errors.

As shown in FIG. 24, in the white-tape mode, a method of least squares is employed in calculate the approximate straight lines $l_1$, $l_2$ or approximate curves which pass through all data points representing the cross-sectional configuration of the surface of the tape or some of the data points including the tape edges. In consequence, if the thickness of the tape is known, it is possible to calculate the approximate straight lines $l_1$, $l_2$ or the approximate curves which are compensated for in accordance with the thickness. Accordingly, the Y coordinates corresponding to the X coordinates of the tape edges can be obtained from these approximate straight lines $l_3$, $l_4$ or the approximate curves (Graph (a) of FIG. 24).

In the black-tape mode, a method of least squares is employed to calculate the approximate straight lines $l_1$, $l_2$ or approximate curves which pass through all data points representing the cross-sectional configuration of the subject of the tape or some of the data points including the tape edges. In consequence, the Y coordinates corresponding to the X coordinates of the tape edges can be obtained from these approximate straight lines $l_3$, $l_4$ or the approximate curves (Graph (b) of FIG. 24).

It is to be noted that, although the coordinates of the tape edges are measured through measurement of the configuration data of the portion with a high reflectance, the configuration data of the portion with a low reflectance may also be measured. In this case, however, if the reflectance is remarkably low, it becomes difficult to obtain a sufficient level of output from the photodetector. Accordingly, it is preferable to select an object to be measured.

In each of the above-described embodiments, the object is constituted by the subject and the tape stuck thereto, and the tape and the subject differ from each other in reflectance. However, instead of the tape, a tape-shaped coat may be formed on the subject.

As is evident from the above description, the present invention provides the following advantages.

In the inventive method of measuring the cordinates of tape edges, the object is constituted by the subject and the tape stuck thereto, and the subject and the tape differ from each other in reflectance. Thus, the portion of the object on which the reflectance greatly changes is optically detected, thereby measuring the coordinates of the tape edges. This enables the coordinates of tape edges to be measured in a non-contact manner. Also, since the tape edges can be automatically discriminated, it is possible to measure the coordinates in a short time. Moreover, if a white tape having a high reflectance and a black tape having a low reflectance are selectively employed, it is possible to easily measure the coordinates of tape edges attached to any kind of surface other than a glossy surface such as a mirror.

In the inventive apparatus for measuring the coordintes of tape edges, the detecting optical head which includes the deflected-beam projecting means, the light receiving means, the focus oscillating means and the beam-spot detecting means is provided with the function of measuring the cross-sectional configuration of an object and the function of detecting the coordinates of each edge of a tape. The tape is attached to a surface of the object in such a manner that the tape and the surface differ from each other in reflectance. In this arrangement, these functions is capable of operating at the same time. Accordingly, it is possible to efficiently and accurately measure the coordinates of tape edges. The inventive apparatus further includes means for generating an error signal when the means detects the fact that the object is positioned in mirror-reflection relationship with the detecting optical head. Such an inventive combination enables the detection of mirror reflection. Accordingly, even when a three-dimensional object having a complicate configuration is measured, the accuracy of measurement does not lower.

What is claimed is:

1. A method of measuring the coordinates of an object with respect to a coordinate system, comprising the steps of:
   (a) attaching a tape having edges to a surface of said object to be measured such that at least one edge of said tape is placed along a measurement line on said surface, said tape and said surface differing from each other in reflectance;
   (b) projecting a spot beam in a scanning manner onto an area of said surface of said object that includes said edges of said tape such that said area reflects said spot beam, said scanning being accomplished by deflecting said spot beam within a predetermined width which allows said spot beam to traverse said edges; and
   (c) detecting the portion of said area at a predetermined angle with respect to the direction of the projection of received spot beam, where the reflectance of said reflected spot beam varies sharply, and producing signals representative of said detected reflectance; and
   (d) processing said signals to obtain the two-dimensional coordinates of said edges of said tape and thereby determine the position of said object.

2. The method according to claim 1 further comprising the steps of:
   (a) scanning the light reflected from said area in a direction perpendicular to the direction of deflection of said spot beam sequentially in time; and
   (b) eliminating those reflectance signals that represent noise.

3. The method according to claim 2, further comprising setting a spot-beam projecting position in conformance with the position of said surface having said tape attached thereto in a heightwise direction, after said step of attaching said tape.

4. The method according to claim 2, wherein said object to be measured is a three-dimensional subject and wherein said tape is attached to said three-dimensional subject such that at least one of said edges of said tape is placed along one edge of said three-dimensional subject.

5. An apparatus for measuring the coordinates of an object with respect to a coordinate system, comprising:
   (a) a detecting optical head including projecting means for projecting a deflected spot beam in a scanning manner onto a measurement area of a surface of an object to be measured, said measurement area having a tape attached thereto such that at least one edge of said tape is placed along a measurement line on said surface to be measured, said tape and said surface differing from each other in reflectance; light receiving means for converging spot beam light reflected from said measurement area in a direction perpendicular to the direction of deflected scan of said spot beam and at a predetermined angle with respect to the direction of projection of said spot beam to thereby focus an image on a predetermined position; focus position oscillating means for oscillating said image focused by said light receiving means in a direction perpendicular to the direction of deflected scan of said spot beam; and a detecting optical head having beam-spot detecting means for detecting the presence of said reflected spot beam light focused by said light receiving means within an area having a predetermined length in the direction of deflected scan of said spot beam and an extremely small width in a direction perpendicular to said direction of deflected scan of said spot beam;
   (b) measuring means for measuring the cross-sectional configuration of said tape by obtaining the two-dimensional coordinates of a cross-sectional configuration of said object including said tape through processing of a deflection signal from said projecting means for projecting said deflected spot beam and an oscillation signal from said focus position oscillating means while employing a detection signal from said beam-spot detecting means as a synchronizing signal; and
   (c) processing means for calculating the coordinates of said edge of said tape from said two-dimensional coordinates obtained by said means for measuring the cross-sectional configuration of said tape.

6. The apparatus according to claim 5 further comprising means for moving said detecting optical head in a direction perpendicular to the direction of deflection of said spot beam.

7. The apparatus according to claim 6 further comprising means for generating an error signal when said object is positioned in mirror-reflection relationship with said detecting optical head.

* * * * *